(12) United States Patent
Ahmed

(10) Patent No.: US 12,326,631 B2
(45) Date of Patent: Jun. 10, 2025

(54) DISPLAY WITH A DISTRIBUTED NANO LIGHT EMITTING DIODE BACKLIGHT

(71) Applicant: Intel Corporation, Santa Clara, CA (US)

(72) Inventor: Khaled Ahmed, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 914 days.

(21) Appl. No.: 17/133,136

(22) Filed: Dec. 23, 2020

(65) Prior Publication Data

US 2021/0116753 A1    Apr. 22, 2021

(51) Int. Cl.
    *G02F 1/00*            (2006.01)
    *G02F 1/13357*      (2006.01)

(52) U.S. Cl.
    CPC .............................. *G02F 1/133603* (2013.01)

(58) Field of Classification Search
    None
    See application file for complete search history.

(56) References Cited

U.S. PATENT DOCUMENTS

| | | | |
|---|---|---|---|
| 2009/0032095 A1* | 2/2009 | Schultz | H01L 31/056 438/57 |
| 2013/0248817 A1* | 9/2013 | Kim | H01L 33/24 977/700 |
| 2016/0291397 A1* | 10/2016 | Pyo | H05K 7/2099 |
| 2019/0335553 A1* | 10/2019 | Ahmed | H10D 86/60 |
| 2020/0249525 A1* | 8/2020 | Gu | G02F 1/133514 |
| 2020/0387035 A1* | 12/2020 | Oh | G02F 1/133621 |

FOREIGN PATENT DOCUMENTS

CN            114664987 A      6/2022

\* cited by examiner

*Primary Examiner* — Gerald J Sufleta, II
(74) *Attorney, Agent, or Firm* — Banner & Witcoff Ltd.

(57) ABSTRACT

Particular embodiments described herein provide for an electronic device that can be configured to include a display. The display can include a liquid crystal array and a backplane. The backplane generates a backlight created by a plurality of microLEDs and each microLED is comprised of a plurality of nano-pyramid LEDs, where each nano-pyramid has a receiving pad coupling layer that is coupled to the receiving pad on the backplane. The backplane can include a plurality of blue microLEDs, a plurality of green microLEDs, and a plurality of red microLEDs

16 Claims, 18 Drawing Sheets

DISPLAY WITH A DISTRIBUTED NANO LIGHT EMITTING DIODE BACKLIGHT

TECHNICAL FIELD

This disclosure relates in general to the field of computing, and more particularly, to a display with distributed nano light emitting diode backlight.

BACKGROUND

End users have more electronic device choices than ever before. A number of prominent technological trends are currently afoot and these trends are changing the electronic device landscape. Some of the technological trends involve electronic devices with displays. Generally, a display is an output device that displays information in pictorial form to a user.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Example Embodiments

Figure 1A:
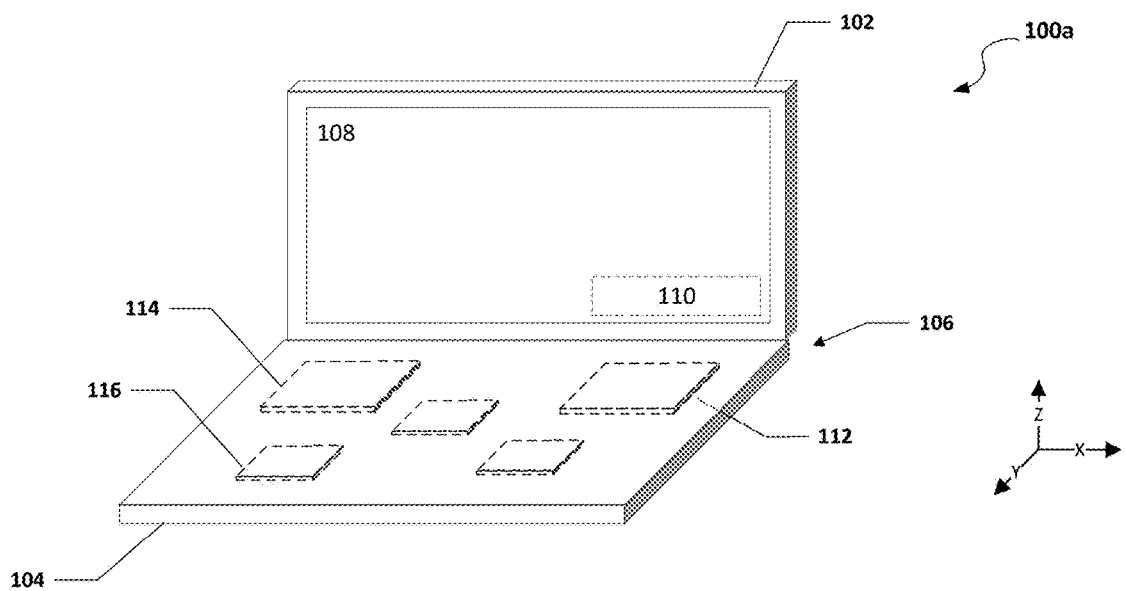
FIG. 1A is a simplified block diagram of a system to enable a display with distributed light emitting diode (LED) backlight, in accordance with an embodiment of the present disclosure.

The following detailed description sets forth examples of devices, apparatuses, methods, and systems relating to a display with a distributed nano light emitting diode backlight. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

The terms "over," "under," "below," "between," and "on" as used herein refer to a relative position of one layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "directly on" a second layer is in direct contact with that second layer. Similarly, unless explicitly stated otherwise, one feature disposed between two features may be in direct contact with the adjacent features or may have one or more intervening layers.

Implementations of the embodiments disclosed herein may be formed or carried out on a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example. The term "about" includes a plus or minus fifteen percent (±15%) variation.

FIG. 1A is a simplified block diagram of an electronic device 100*a* configured to enable a display with nano-pyramid light emitting diodes (LEDs), in accordance with an embodiment of the present disclosure. In an example, electronic device 100*a* can include a first housing 102 and a second housing 104. First housing 102 can be pivotably coupled to second housing 104 using a hinge 106. First housing 102 can include a display 108 and a timing controller (TCON) 110. Second housing 104 can include a keyboard (not shown), memory 112, one or more processors 114, and one or more electronic components 116. TCON 110 is a timing controller on the display side. One or more processors 114 can include a display engine. One or more electronic components 116 can be a device or group of devices available to assist in the operation or function of electronic device 100*a*.

Figure 1B:
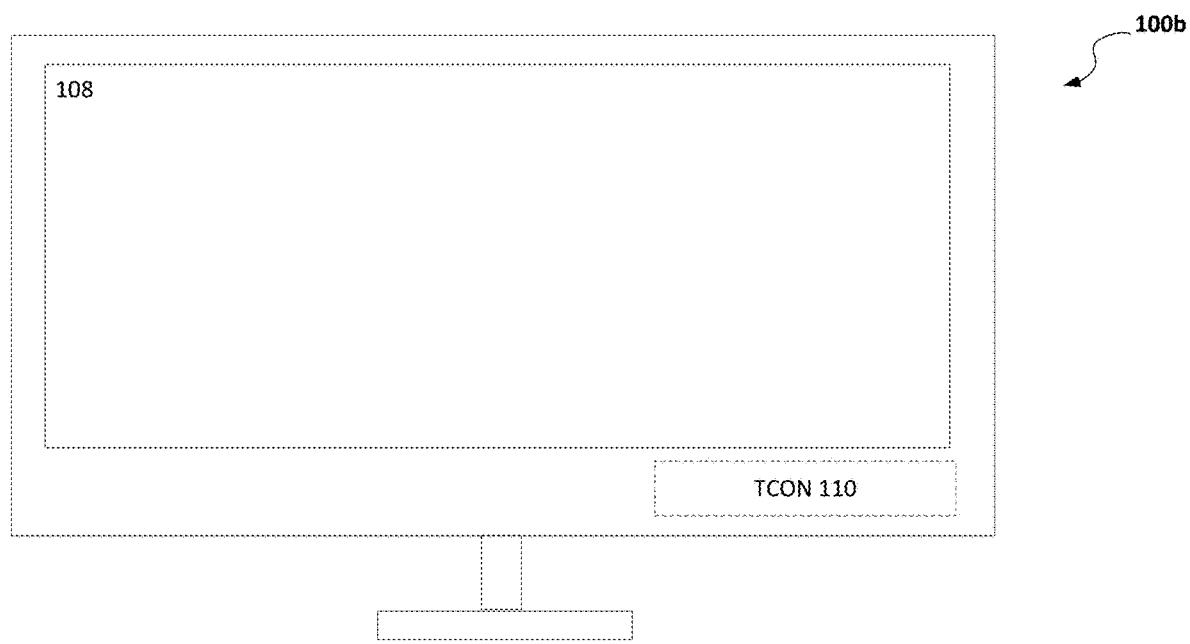
FIG. 1B is a simplified block diagram of a system to enable a display with distributed LED backlight, in accordance with an embodiment of the present disclosure.

Turning to FIG. 1B, FIG. 1B is a simplified block diagram of an electronic device 100*b* configured to enable a display with nano-pyramid LEDs, in accordance with an embodiment of the present disclosure. In an example, electronic device 100*b* can be a computer monitor, a computer display, free-standing display monitor, etc. Electronic device 100*b* can include display 108, TCON 110, memory 112, one or more processors 114, and one or more electronic components 116. One or more electronic components 116 can be a device or group of devices available to assist in the operation or function of electronic device 100*b*.

Figure 1C:
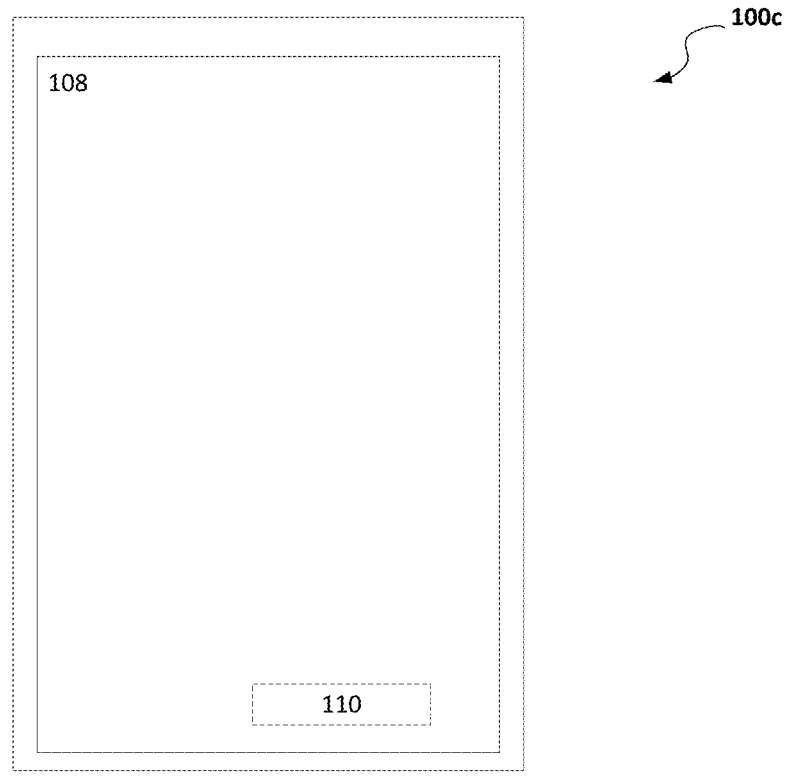
FIG. 1C is a simplified block diagram of a system to enable a display with distributed LED backlight, in accordance with an embodiment of the present disclosure.

Turning to FIG. 1C, FIG. 1C is a simplified block diagram of an electronic device 100*c* configured to enable a display with nano-pyramid LEDs, in accordance with an embodiment of the present disclosure. In an example, electronic device 100*c* can be a smartphone, handheld computer, tablet computer, 2-in-1 computer, convertible computer, etc. Electronic device 100*c* can include display 108, TCON 110, memory 112, one or more processors 114, and one or more electronic components 116. One or more electronic components 116 can be a device or group of devices available to assist in the operation or function of electronic device 100c.

Various embodiments described herein generally involve techniques to communicate display data to one or more display devices through a display interface. Display interfaces (e.g., display port, HDMI, DVI, Thunderbolt®, or the like) provide for the communication of display data between a computing device and a display device. For example, a computing device may transmit display data to a display device using a display interface. Display data includes indications of an image to be displayed. For example, display data includes information (e.g., RGB color data, etc.) corresponding to pixels of the display, that when communicated over the display interface, allows the display device to display an image (e.g., on a screen, by projection, etc.). Various display interfaces exist and the present disclosure is not intended to be limited to a particular display interface. Furthermore, the number of pixels and the displayable colors for each pixel varies for different displays. The number of pixels, the displayable colors, the display type, and other characteristics that may be referenced herein, are referenced to facilitate understanding and is not intended to be limiting.

In some examples, a display device may include a number of TCON and drivers configured to receive display data and cause the display device to display an image based on the display data. The TCON and drivers receive the display data, decode the display data and cause the display device to display an image corresponding to the display data (e.g., by illuminating pixels, projecting colors, etc.). The TCON and drivers may be configured to control or may be operative on the pixels within different portions of the display device.

Display 108 can be an LCD display that has high dynamic range and consumes a relatively low amount of power. The range between the very bright pixels and very dark pixels is the dynamic range and high dynamic range means there is are very bright pixels and very dark pixels. If there is a uniform light, then the display would not have an acceptable level of contrast.

One way to achieve an acceptable level of contrast is to use local dimming to help achieve the very dark pixels. Local dimming is a process where there is not any light from the backlight array in an area that should have very dark pixels. When an area requires very bright pixels, very high levels of light can be sent from the backlight. Using local dimming can also save power as light from the backlight is not being generated when it is not needed. To create more zones for local dimming, some systems use microLEDs where local dimming can be achieved at a micrometer size.

Current LCD displays have a backlight behind a liquid crystal array and require a good white light as the back filter. The liquid crystals have red, green, and blue filters and to obtain red light, the light from the backlight is filtered through the red filter, to obtain green light, the light from the backlight is filtered through the green filter, and to obtain blue light, the light from the backlight is filtered through the blue filter. A switch is used to control the light going through the filters.

Most current LCD displays that include microLEDs use blue microLEDs on a backplane to create the backlight. The blue microLEDs are coated with a film of quantum dots that include both red and green conversion. The blue light from the blue microLEDs goes through the red and green quantum dot film and is converted into blue light beams, green light beams, and red light beams. A diffuser combines the blue light beams, green light beams, and red light beams to create the white color light beam necessary for an LCD backlight.

One problem with using the quantum dot film is that the quantum dot film covers the whole area of microLEDs and the quantum dot film includes cadmium which can be very toxic. In current designs, a relatively large amount of the quantum dot film is used to convert blue light from the blue microLED into a red beam of light and a green beam of light. Some systems use cadmium-free quantum dot films but the cadmium-free quantum dot films are not as efficient from a light conversion point of view and they do not have the same quality of color as other quantum dot films. Another problem with quantum dot films is that the blue light from the blue microLEDs can go through the quantum dot film at different angles and the amount of blue light going through the quantum dot film in one direction can be different than the amount of blue light going through the quantum dot film from different directions. This creates a halo effect and can create an artifact or a yellow color in some parts of the LCD display.

In an example, display 108 can be configured to use quantum dot film for the red conversion where the blue light from the blue microLEDs goes through the red quantum dot film to create the red beam of light, to use quantum dot film for the green conversion where the blue light from the blue microLEDs goes through the green quantum dot film to create the green beam of light, and the blue light from the blue microLEDs does not go through any quantum dot film. By having the quantum dot film only over the microLEDs that are being used to create the red beams of light and the green beams of light, less quantum dot film is used as compared to some current designs. In addition, because the blue light from the blue microLED is not passing through a quantum dot film, the halo effect can be reduced or even eliminated.

In another example, display 108 can be configured to use quantum dot film for the red conversion where the blue light from the blue microLEDs goes through the red quantum dot film to create the red beam of light. Green microLEDs can produce green light and the green light from the green microLEDs does not need to go through a quantum dot film to create the green beam of light. The blue light from the blue microLEDs does not go through any quantum dot film. By having the quantum dot film only over the microLEDs that are being used to create the red beams of light, less quantum dot film is used as compared to some current designs. In addition, because the blue light from the blue microLED is not passing through a quantum dot film, the halo effect can be reduced or even eliminated.

In yet another example, display 108 can be configured to not use any quantum dot film. Red microLEDs can produce red light and the red light from the red microLEDs does not need to go through a quantum dot film to create the red beam of light. Green microLEDs can produce green light and the green light from the green microLEDs does not need to go through a quantum dot film to create the green beam of light. The blue light from the blue microLEDs does not go through any quantum dot film. In addition, because the blue light from the blue microLED is not passing through a quantum dot film, the halo effect can be reduced or even eliminated.

In a specific example, the microLEDs are made using gallium nitrite and are doped with indium. The more indium that is used, the more the color is red, the less amount of indium that is used, the more the color is blue, and a middle amount of indium can be used to create the color green. By creating the microLEDs using gallium nitrite doped with indium, each microLED can be almost any color. Current systems only blue microLEDs as an admitter and require a quantum dot film. Display 108 can include microLEDs of almost any color and can reduce or eliminate the use of the quantum dot film.

Yet another problem with current microLEDs is the cost of manufacturing. More specifically, with current systems, the microLEDs are transferred from the wafer to the backplane in a serial fashion and creation of the LCD display can take a relatively long amount of time and is relatively expensive. In addition, during manufacturing, yield can be an issue. More specifically, the required microLED die yield to achieve eighty percent (80%) display production line yield is 99.99999%. This is very stringent and is almost impossible to achieve using current systems and methods.

Display 108 can include an array of a plurality of connected nano-pyramids LEDs and the array of connected nano-pyramid LEDs can comprise the microLEDs. Each of plurality of microLEDs 120 can be about three (3) micrometers by about three (3) micrometers, about five (5) micrometers by about five (5) micrometers in size, about ten (10) micrometers by about ten (10) micrometers in size, or larger. MicroLEDs 120 do not need to be a square shape and can be almost any shape (e.g., circle, hexagon, etc.) and include at least two nano-pyramid LEDs 122. If one nano-pyramid LED (or 10 nano-pyramid LEDs or more) is not functional, the rest of the nano-pyramid LEDs can still function. That gives a huge advantage in terms of yields and cost. Also, with nano-pyramid LEDs, the nano-pyramid LEDs that can create red light, green light, and blue light can all be grown on the same wafer.

Also, the mirror structure for the microLEDs can be built on the nano-pyramid LEDs. In current systems, the mirror structure is normally built on the backplane. In an example, the mirror structure for the nano-pyramid LED is added to the nano-pyramid LED at the end of the manufacturing process when the nano-pyramid LED is still on the manufacturing wafer. In a specific example, the nano-pyramid LED are created or grown on a wafer, then a mirror is added to the nano-pyramid LEDs on the wafer, a coupon of a plurality of nano-pyramid LEDs is cut from the wafer to create a microLED, and the coupon (that includes the nano-pyramid LEDs and the mirror) is bonded to a backplane.

It is to be understood that other embodiments may be utilized and structural changes may be made without departing from the scope of the present disclosure. Substantial flexibility is provided by electronic devices 100a-100c in that any suitable arrangements and configuration may be provided without departing from the teachings of the present disclosure.

For purposes of illustrating certain example techniques of electronic devices 100a-100c, the following foundational information may be viewed as a basis from which the present disclosure may be properly explained. End users have more media and communications choices than ever before. A number of prominent technological trends are currently afoot (e.g., more computing devices, more online video services, more Internet traffic, etc.), and these trends are changing the media delivery landscape. One change is the use of a display. Generally, a display is an output device that displays information in pictorial form to a user.

Early electronic computers were fitted with a panel of light bulbs where the state of each particular bulb would indicate the on/off state of a particular register bit inside the computer. This allowed the engineers operating the computer to monitor the internal state of the machine, so this panel of lights came to be known as the 'monitor'. As early monitors were only capable of displaying a very limited amount of information and were very transient, they were rarely considered for program output. Instead, a line printer was the primary output device, while the monitor was limited to keeping track of the program's operation. Some of the first computer monitors used cathode ray tubes (CRTs). However, computer monitors that use CRTs are typically large heavy devices.

LCDs were created to reduce the size, weight, power consumption, etc. of displays. As computers became portable, the primary use of LCD technology as computer monitors was in laptops where the lower power consumption, lighter weight, and smaller physical size of the LCD display justified the higher price of an LCD display versus a CRT display. The dynamic range of early LCD panels was very poor, and although text and other motionless graphics were sharper than on a CRT, an LCD characteristic known as pixel lag caused moving graphics to appear noticeably smeared and blurry. Current LCD displays offer better resolution and other advantages over CRT displays and most displays available today are LCD displays.

One trend in LCD displays is high dynamic range (HDR). HDR is an emerging technology that enables a user to view relatively good quality images, including higher contrast ratio, darker black state, more gray levels and more vivid colors. Displays that can support HDR can usually offer brighter highlights and a wider range of color detail. For an organic light-emitting diode (OLED) display, it is fairly easy to obtain a true black state, but to obtain a brightness over 1000 nits can lead to a compromised lifetime that is unacceptable to most consumers. On the contrary, it is relatively easy to boost an LCD's peak brightness to 1000 nits, but to lower the dark state to less than 0.01 nits is challenging. If a LCD's contrast ratio can be improved, then more grayscales can be displayed. One promising candidate is local dimming.

LCDs use a backlight that is typically created using LEDs. More specifically, most current systems use blue mini-LEDs with a yellow phosphor layer to produce white light in the backlight unit of an LCD. This does not allow for a good color gamut and does not allow for white color point tuning. In some current systems, to improve the color gamut, quantum dots are used. For example, quantum dot-enhanced liquid crystal display uses quantum dots films that include both red and green quantum dots to facilitate a display with a better color gamut. The quantum dot film covers each blue LED in the backlight unit. For example, quantum dots formed from cadmium selenide (CdSe) may be gradually tuned to emit light from the red region of the visible spectrum for a 5 nm diameter quantum dot and to the violet region for a 1.5 nm quantum dot. By varying the dot size in a quantum dot field, the entire visible wavelength, ranging from about 460 nm (blue) to about 650 nm (red), may be reproduced.

One of the common issues with quantum dots is that they are potentially toxic. Cadmium-free quantum dots or heavy metal-free quantum dots may be desirable for consumer goods applications. Another issue is the high production cost for the quantum dots in the display. There remains a need for designing the quantum dot-enhanced liquid crystal display to achieve reduced toxicity, improved performance, and lower cost in fabrication. It should be mentioned that cadmium-free quantum dots are available, but they are not as efficient as cadmium-based quantum dots. Displays available today typically have a relatively high cost because use of quantum dot material can increase the overall cost of the display. Also, quantum dot films in current LCD displays typically cover the all LEDs in the backlight unit, which means the amount of quantum dots film is relatively high and can be toxic.

For an LCD display, the current means to employ local dimming is to divide the LED backlight into 100s of segments. However, this is far from the desired pixel-level local dimming. With some algorithm optimization, dimming accuracy can be improved, but the cost and complexity would also increase. Therefore, HDR LCD display with pixel-by-pixel local dimming remains a big challenge.

Mini-LED usage is a good backlight candidate to enable local dimming for LCDs. In addition to high brightness (>1000 nits), a mini-LED backlight can provide more than 1000 local dimming zones. Also, due to the small dimension of mini-LEDs, they can allow for a freeform outline and a narrow bezel, which is highly desirable for smartphone applications. However, if 1000s of local dimming zones are produced, the cost becomes very high due to the current manufacturing cost of pick and place methods used to transfer mini-LEDs from donor wafers to the backlight light board. Also, mini-LEDs with 100s of local dimming zones creates a halo effect.

Conventional planar-type semiconductor-based LEDs are generally patterned from layers grown across a wafer surface. More particularly, planar-type semiconductor-based LEDs include one or more semiconductor-based active layers sandwiched between thicker semiconductor-based cladding layers. More recently bottom-up approaches have been used to form nanowire LED structures that may offer several advantages to the planar-type LEDs, including lower dislocation density, greater light extraction efficiency, and a larger active region surface area relative to substrate surface area. However, it is relatively difficult to achieve green and red emission with high efficiency using nanowire LEDs due to the inability to grow high indium content InGaN on the m-plane of nanowires. Triple redundancy of microLEDs has been proposed to reduce the required microLED wafer die yield from 99.99999% to only 99.95%. However, the use of microLED redundancy results in increased cost of production of microLED displays, especially if the pick and place transfer is used to manufacture microLED displays. What is needed is a display with nano-pyramid LEDs that form microLEDs.

A device configured to include a display with distributed LED backlight, as outlined in FIGS. 1A-1C, can resolve these issues (and others). In an example, an electronic device (e.g., electronic devices 100a-100c) can be configured to include a display with a nano-pyramid LEDs. More specifically, the electronic device can be configured to include an array of nano-pyramids LEDs that form a microLED. The array of nano-pyramid LEDs can be connected together to make microLEDs that include tens of nano-pyramids, hundreds of nano-pyramids, thousands of nano-pyramids, or millions of nano-pyramids. The advantage of that is if one nano-pyramid LED (or 10 nano-pyramid LEDs or more) is not functional, the rest of the nano-pyramid LEDs can still function. That gives a huge advantage in terms of yields and cost. Also, with nano-pyramid LEDs, the nano-pyramid LEDs can create red light, green light. and blue light on the same wafer used to create the nano-pyramid LEDs.)

In an example, an electronic device (e.g., electronic devices 100a-100c) can be configured to include a display with a distributed LED backlight that uses a relatively small amount of a quantum dot film or no quantum dot film. More specifically, display 108 can be configured to use quantum dot film for the red conversion where the blue light from the blue microLEDs goes through the red quantum dot film to create the red beam of light, to use quantum dot film for the green conversion where the blue light from the blue microLEDs goes through the green quantum dot film to create the green beam of light, and the blue light from the blue microLEDs does not go through any quantum dot film. By having the quantum dot film only over the microLEDs that are being used to create the red beams of light and the green beams of light, less quantum dot film is used as compared to some current designs. In addition, because the blue light from the blue microLED is not passing through a quantum dot film, the halo effect can be reduced or even eliminated.

In another example, display 108 can be configured to use quantum dot film for the red conversion where the blue light from the blue microLEDs goes through the red quantum dot film to create the red beam of light. Green microLEDs can produce green light and the green light from the green microLEDs does not need to go through a quantum dot film to create the green beam of light. The blue light from the blue microLEDs does not go through any quantum dot film. By having the quantum dot film only over the microLEDs that are being used to create the red beams of light, less quantum dot film is used as compared to some current designs. In addition, because the blue light from the blue microLED is not passing through a quantum dot film, the halo effect can be reduced or even eliminated.

In yet another example, display 108 can be configured to not use any quantum dot film. Red microLEDs can produce red light and the red light from the red microLEDs does not need to go through a quantum dot film to create the red beam of light. Green microLEDs can produce green light and the green light from the green microLEDs does not need to go through a quantum dot film to create the green beam of light. The blue light from the blue microLEDs does not go through any quantum dot film. In addition, because the blue light from the blue microLED is not passing through a quantum dot film, the halo effect can be reduced or even eliminated.

In a specific example, the microLEDs are made using gallium nitrite and are doped with indium. The more indium that is used, the more the color is red, the less amount of indium that is used, the more the color is blue, and a middle amount of indium can be used to create the color green. By creating the microLEDs using gallium nitrite doped with indium, each microLED can be almost any color. Current systems only blue microLEDs as an admitter and require a quantum dot film. Display 108 can include microLEDs of almost any color and can reduce or eliminate the use of the quantum dot film By using vertical type mini-LEDs (size about 50 µm) the bulky SMD LEDs can be reduced and the overall thickness and cost (of packaging SMDs) can be reduced. In addition, mini-LEDs can help to reduce or eliminate the halo effect. The use of toxic quantum dot material is minimized while achieving an acceptable color gamut. The white color point can be fine-tuned by controlling red, green, and blue light sources (the microLEDs) in the backlight unit to help create HDR quality displays. In addition, the backlight power consumption depends on the number of segments. As the segment number increases, the power consumption decreases. Decreased power consumption can then be used to increase backlight luminance or brightness. Therefore, by increasing the number of segments, an LCD with lower power consumption and higher luminance or brightness can be realized to help create HDR quality displays.

In some current systems, light emitters such as LEDs are created by stacking material like a pancake stack to make the LEDs. The LEDs are called planar LEDs. Display 108 can include an array of nano-pyramids that are connected together to make one or more microLEDs that include about tens of nano-pyramids, hundreds of nano-pyramids, thousands of nano-pyramids, or millions of nano-pyramids. This gives a huge advantage in terms of yields and cost. Also, with nano-pyramids, red nano-pyramids, green nano-pyramids, and/or blue nano-pyramids can all be grown on the same wafer to create red microLEDs, green microLEDs, and blue microLEDs. In current systems, using planar LEDs, red microLEDs, green microLEDs, and blue microLEDs cannot be made on the same wafer. Also, in current systems using planar LEDs, green microLEDs, and blue microLEDs cannot be made on the same wafer.

Once the nano-pyramids are grown on a wafer, a mirror structure can be added to the nano-pyramids as opposed to current systems where the mirror structure is normally built on the backplane and the mirror is added to the LEDs at the end of the manufacturing process. After the nano-pyramid LEDs are grown on the wafer and the mirror is added, the nano-pyramids with the mirrors can be stamped or transferred to the backplane. In an example, a receiving pad is added to the backplane in the area of the backplane where the nano-pyramids with the mirrors are to be added. In an example, the receiving pad is a copper receiving pad. The backplane needs to have a receiving pad to selective bond the nano-pyramids to the area of the backplane that includes the receiving pad. If the receiving pads were not used on the backplane, all the nano-pyramids on the wafer might touch or come into contact with the backplane and selective bonding is lost. The nano-pyramids on the wafer that were outside of the area of the receiving pad can be bonded to a different receiving pad on the same backplane or on a different backplane.

This process allows the nano-pyramids (e.g., an array of blue and green microLEDs) to be transferred from the wafer to the backplane in a direct transfer process unlike the pick and place technology of current systems. The direct transfer process is a mass transfer process that can save time and allow for costs reduction as compared to current systems. The direct transfer process is designed for mass transfer of nano-pyramids from the wafer to the backplane and in some examples, may also be used to transfer mini-LEDs to a light board. It is mass transfer process because during manufacturing, more than 5000 zones can be achieved for the backlight unit with mini-LEDs for low cost of manufacturing.

In some examples, both blue and green microLEDs are transferred to the backplane at once. Then a red color conversion film can be deposited on some of the blue microLEDs to produce a red color. The color conversion film may include quantum dots. For example, a red quantum dot film can be coated on some of the blue microLEDs to produce red light. The quantum dot film does not need to extend or be coated on the remaining microLEDs and minimal amount of toxic quantum dot material is used in the display, thus achieving product safety.

In an illustrative example, the direct transfer can be used for transferring blue and green microLEDs from a single silicon wafer (12" in diameter) to the LED board of the backlight unit. First, microLEDs (made of an array of nanopyramids) are made on a 12" silicon wafer (for cost reduction). Then coupons are cut from the silicon wafer. The coupon has both blue and green microLEDs on it. The coupon is aligned to the LED board where there exists an array of receiving pads (e.g., copper pads) printed on the LED board. The microLEDs are bonded on the receiving copper pads using fusion bonding or thermal compression bonding. Then the microLEDs are released from the silicon coupon and donated to the LED board by using infrared laser ablation through the backside of the coupon. The infrared laser is transmitted through the silicon wafer coupon and ablates a release layer where the microLEDs had been grown. The process is repeated until the LED board is populated with microLEDs. This process has a high throughput and, in some examples, the throughput of the process can be one-hundred times higher than pick and place, reducing cost of manufacturing tremendously.

In an example implementation, electronic devices 100a-100c are meant to encompass a computer, a personal digital assistant (PDA), a laptop or electronic notebook, a cellular telephone, mobile device, personal digital assistants, smartphones, tablets, wearables, Internet-of-things (IoT) device, network elements, or any other device that includes an LCD display. Electronic devices 100a-100c may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic devices 100a-100c may include virtual elements.

In regards to the internal structure associated with electronic devices 100a-100c, electronic devices 100a-100c can include memory elements for storing information to be used in operations. Electronic devices 100a-100c may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in electronic devices 100a-100c could be provided in any database, register, queue, table, cache, control list, or other storage structure, all of which can be referenced at any suitable timeframe. Any such storage options may also be included within the broad term 'memory element' as used herein.

In certain example implementations, functions may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations. This includes the memory elements being able to store software, logic, code, or processor instructions that are executed to carry out activities.

In an example implementation, elements of electronic devices 100a-100c may include software to achieve, or to foster, operations. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations.

Additionally, electronic devices 100a-100c may include one or more processors that can execute software or an algorithm to perform activities. A processor can execute any type of instructions associated with the data to achieve the operations. In one example, the processors could transform an element or an article (e.g., data) from one state or thing to another state or thing. In another example, the activities may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Figure 2A:
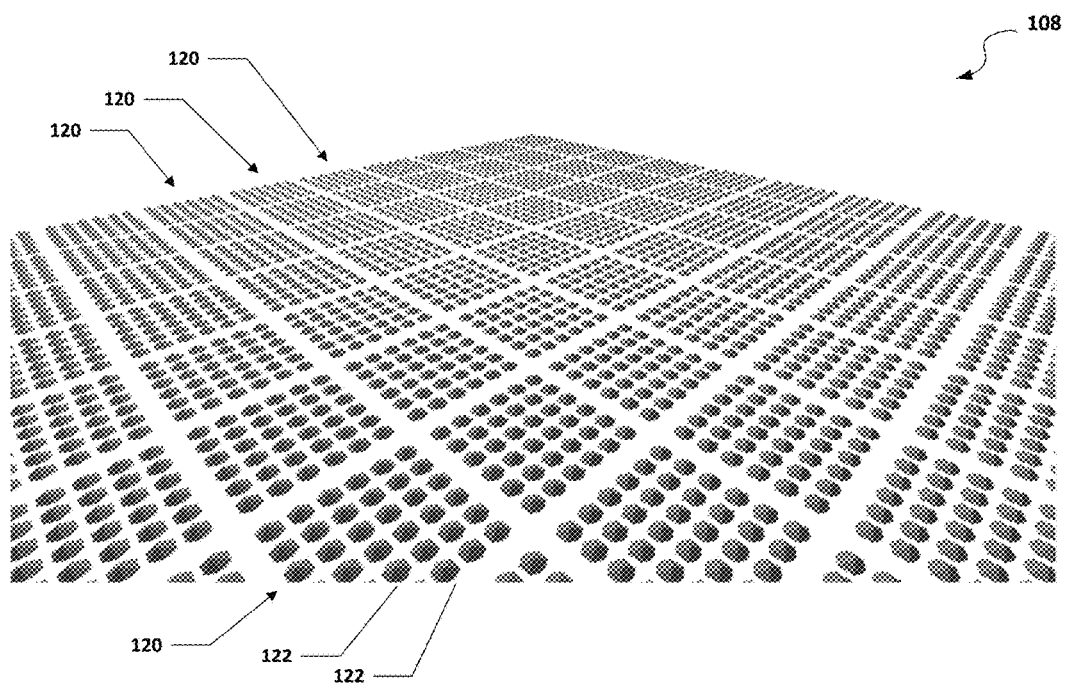
FIG. 2A is a simplified block diagram of a portion of a system to enable a display with distributed LED backlight, in accordance with an embodiment of the present disclosure.
Figure 2B:
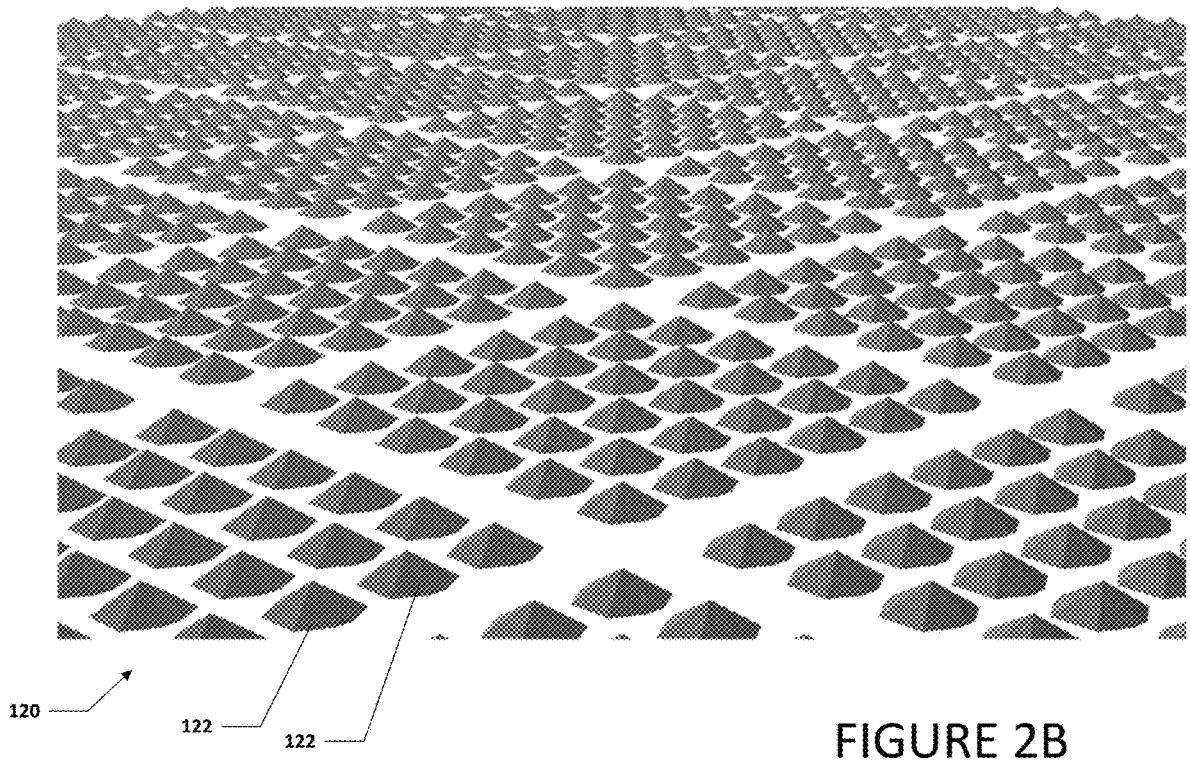
FIG. 2B is a simplified block diagram of a portion of a system to enable a display with distributed LED backlight, in accordance with an embodiment of the present disclosure.

Turning to FIGS. 2A and 2B, FIGS. 2A and 2B are a simplified diagram of display 108 with nano-pyramid LEDs, in accordance with an embodiment of the present disclosure. In an example, display 108 can include a plurality of microLEDs 120. Each microLED 120 can include a plurality of nano-pyramid LEDs 122. Each of plurality of microLEDs 120 can be about three (3) micrometers by about three (3) micrometers, about five (5) micrometers by about five (5) micrometers in size, about ten (10) micrometers by about ten (10) micrometers in size, or larger. MicroLEDs 120 do not need to be a square shape and can be almost any shape and include at least two nano-pyramid LEDs 122.

Figure 3:
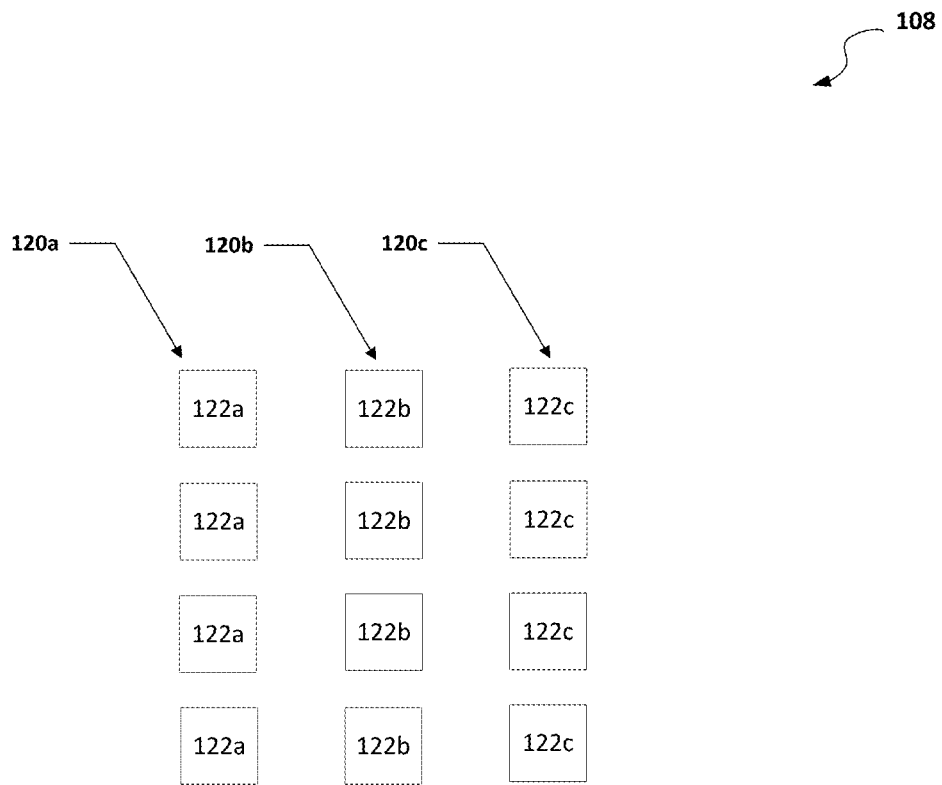
FIG. 3 is a simplified block diagram of a portion of a system to enable a display with distributed LED backlight, in accordance with an embodiment of the present disclosure.

Turning to FIG. 3, FIG. 3 is are a simplified block diagram of display 108 with nano-pyramid LEDs, in accordance with an embodiment of the present disclosure. In an example, display 108 can include a plurality of microLEDs 120. Each microLED 120 can include a plurality of nano-pyramid LEDs 122. In an example, microLEDs 120 can include red, green, and blue nano-pyramids. More specifically, as illustrated in FIG. 3, microLEDs 120a include red nano-pyramid LEDs 122a that emit a red light, microLEDs 120b include green nano-pyramid LEDs 122b that emit a green light, and microLEDs 120c include blue nano-pyramid LEDs 122c that emit a blue light.

Figure 4:
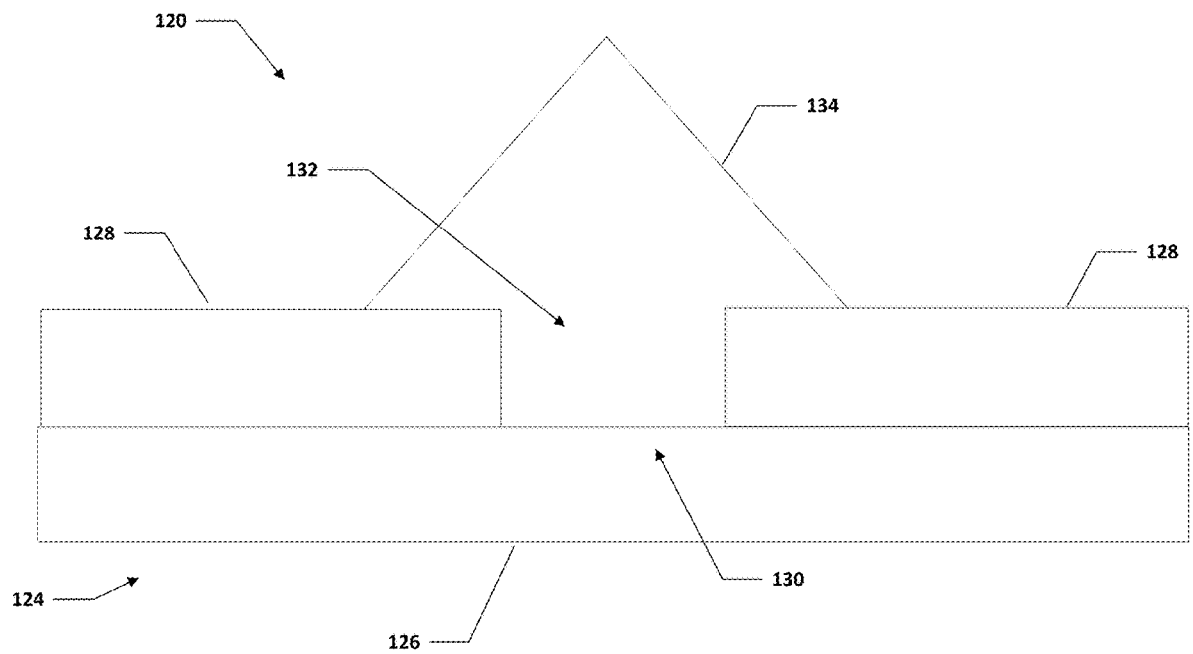
FIG. 4 is a simplified block diagram illustrating example details of a portion of a system to enable a display with distributed LED backlight, in accordance with an embodiment of the present disclosure.

Turning to FIG. 4, FIG. 4 is a simplified block diagram of nano-pyramid LED 122 after being grown on a wafer 124. In an example, wafer 124 can include a substrate layer 126 and a silicon nitride layer 128. Silicon nitride layer 128 can have a cavity 130. Nano-pyramid LED 122 can include a nano-pyramid stem 132 and a nano-pyramid body 134. Nano-pyramid stem 132 can be in cavity 130 of silicon nitride layer 128.

Substrate layer 126 is a base or substrate and can be comprised of silicon sapphire or some other material that can be a base or substrate for nano-pyramid LED 122. Silicon nitride layer 128 can function as a hard mask for subsequent epitaxial growth of gallium nitride and can be comprised of silicon nitride or any other material that can function as a hard mask for subsequent epitaxial growth of gallium nitride. Nano-pyramid stem 132 can function as growth seeds for nano-pyramid body 134 and can be comprised of gallium nitride doped with silicon or any other n-type doping that can function as growth seeds for nano-pyramid body 134. Nano-pyramid body 134 can function as a base to grow the quantum well that results in light emissions from nano-pyramid body 134. Nano-pyramid body 134 can be comprised of an n-type gallium nitride or some other material that will function as a base to grow the quantum well.

Figure 5A:
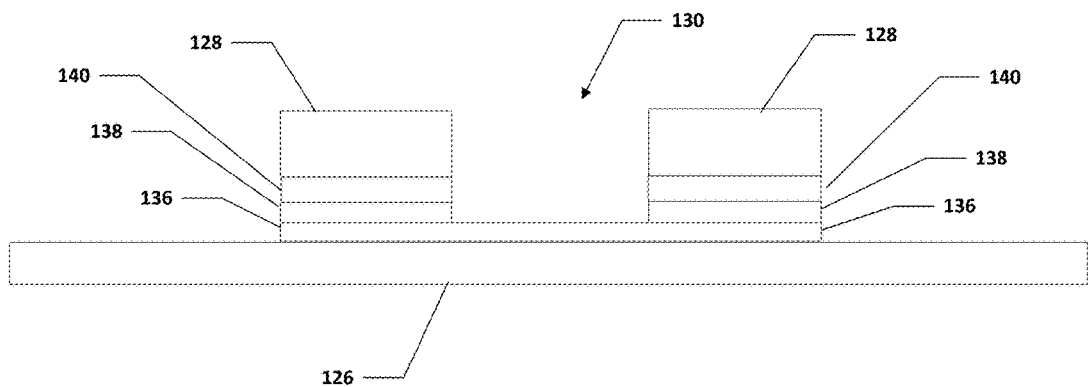
FIG. 5A is a simplified block diagram illustrating example details of a portion of a system to enable a display with distributed LED backlight, in accordance with an embodiment of the present disclosure.

Turning to FIG. 5A, FIG. 5A is a simplified block diagram illustrating example details of an early part of the process of growing nano-pyramid LED 122 on wafer 124. In an example, wafer 124 can include substrate layer 126. An aluminum nitride layer 136 can be over substrate layer 126. A metal nitride layer 138 can be over aluminum nitride layer 136. A silicon dioxide layer 140 can be over aluminum nitride layer 136. Silicon nitride layer 128 can be over silicon dioxide layer 140. As illustrated in FIG. 5A, silicon nitride layer 128, metal nitride layer 138, and silicon dioxide layer 140 can form the inner walls of cavity 130.

Aluminum nitride layer 136 can function as a nucleation layer to grow nano-pyramid stem 132 and nano-pyramid body 134 and can be comprised of aluminum nitride, aluminum scandium nitride or some other material that can function as a nucleation layer to grow nano-pyramid stem 132 and nano-pyramid body 134. Metal nitride layer 138 helps to release nano-pyramid LED 122 from substrate layer 126 using laser irradiation and can be comprised of titanium nitride, niobium nitride, tantalum nitride, or some other metal nitride that can be used to help release nano-pyramid LED 122 from substrate layer 126. Silicon dioxide layer 140 helps to open holes in the silicon nitride mask to allow for selective epitaxial growth of nano-pyramid body 134 out of the aluminum nitride that has been grown on the silicon substrate. Silicon dioxide layer 140 can be comprised of silicon dioxide or any other material that helps to open holes in the silicon nitride mask to allow for selective epitaxial growth of nano-pyramid body 134

Figure 5B:
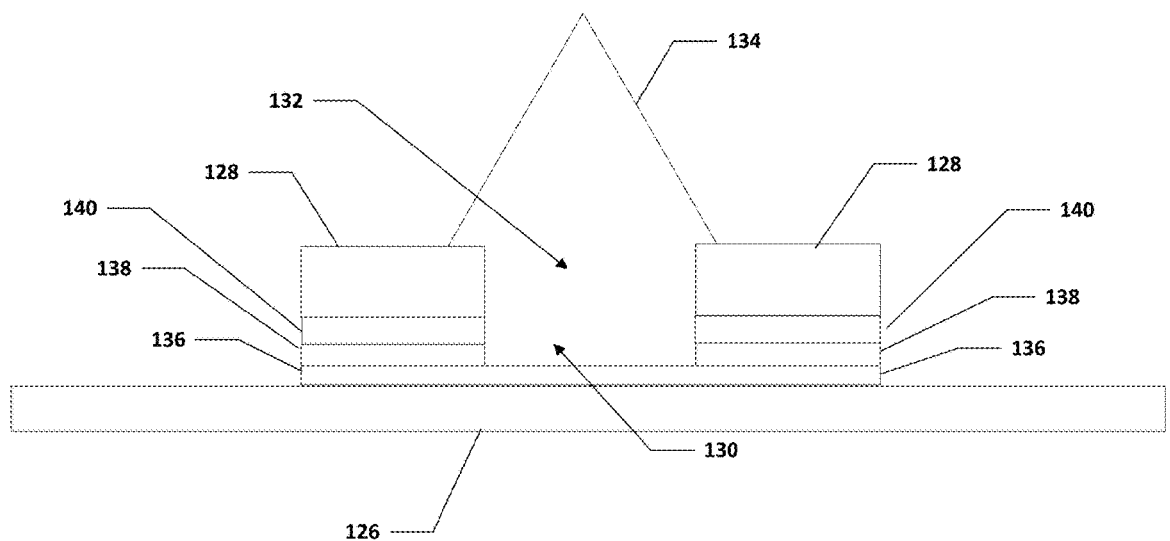
FIG. 5B is a simplified block diagram illustrating example details of a portion of a system to enable a display with distributed LED backlight, in accordance with an embodiment of the present disclosure.

Turning to FIG. 5B, FIG. 5B is a simplified block diagram illustrating example details of an early part of the process of growing nano-pyramid LED 122 on wafer 124. In an example, wafer 124 can include substrate layer 126. Aluminum nitride layer 136 can be over substrate layer 126. Metal nitride layer 138 can be over aluminum nitride layer 136. Silicon dioxide layer 140 can be over aluminum nitride layer 136. Silicon nitride layer 128 can be over silicon dioxide layer 140. Silicon nitride layer 128, metal nitride layer 138, and silicon dioxide layer 140 can form the inner walls of cavity 130.

As illustrated in FIG. 5B, nano-pyramid stem 132 and nano-pyramid body 134 can be grown. More specifically, nano-pyramid stem 132 can be grown in cavity 130 and nano-pyramid body 134 can be grown above silicon nitride layer 128. In an example, nano-pyramid stem 132 and nano-pyramid body 134 can be grown using a metalorganic vapor-phase epitaxy (MOVPE) process or some other type of process that will grow nano-pyramid stem 132 and nano-pyramid body 134. MOVPE, also known as organometallic vapor-phase epitaxy (OMVPE) or metalorganic chemical vapor deposition (MOCVD), is a chemical vapor deposition method used to produce single or polycrystalline thin films and is a process for growing crystalline layers to create complex semiconductor multilayer structures.

Figure 5C:
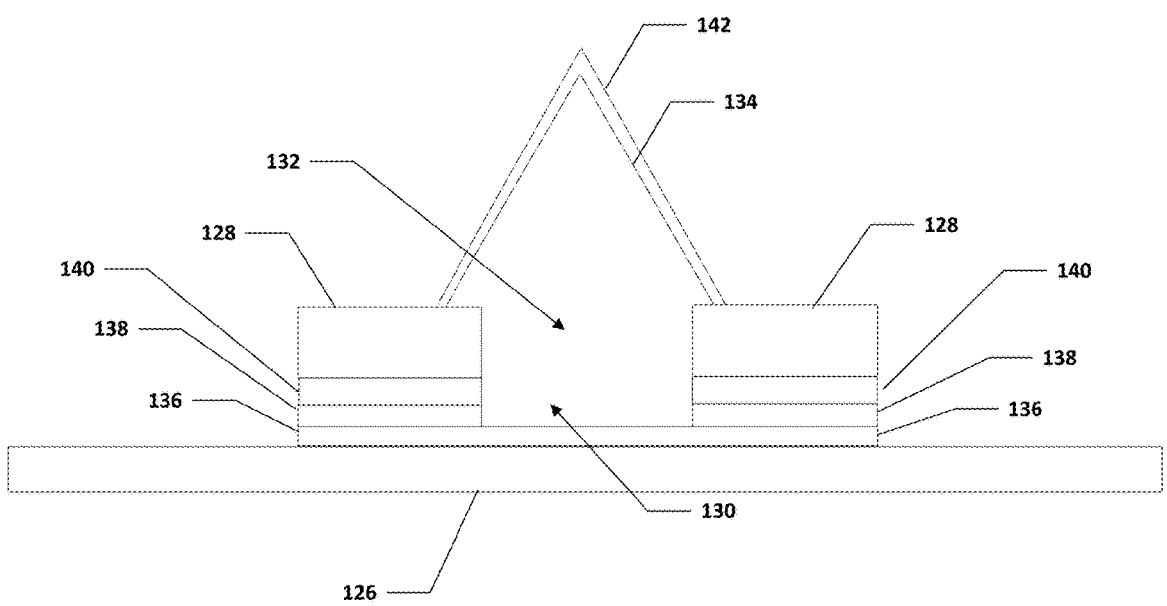
FIG. 5C is a simplified block diagram illustrating example details of a portion of a system to enable a display with distributed LED backlight, in accordance with an embodiment of the present disclosure.

Turning to FIG. 5C, FIG. 5C is a simplified block diagram illustrating example details of a part of the process of growing nano-pyramid LED 122 on wafer 124. In an example, wafer 124 can include substrate layer 126. Aluminum nitride layer 136 can be over substrate layer 126. Metal nitride layer 138 can be over aluminum nitride layer 136. Silicon dioxide layer 140 can be over aluminum nitride layer 136. Silicon nitride layer 128 can be over silicon dioxide layer 140. silicon nitride layer 128, metal nitride layer 138, and silicon dioxide layer 140 can form the inner walls of cavity 130. Nano-pyramid stem 132 can be grown in cavity 130 and nano-pyramid body 134 can be grown above silicon nitride layer 128.

As illustrated in FIG. 5C, an indium gallium nitride/gallium nitride quantum well 142 can be grown over nano-pyramid body 134. Indium gallium nitride/gallium nitride quantum well 142 determines the color of light from the nano-pyramid. In an example, indium gallium nitride/gallium nitride quantum well 142 can be grown using the MOVPE process that was used to grow nano-pyramid stem 132 and nano-pyramid body 134 or some other type of process that will grow indium gallium nitride/gallium nitride quantum well 142 over nano-pyramid body 134.

Figure 5D:
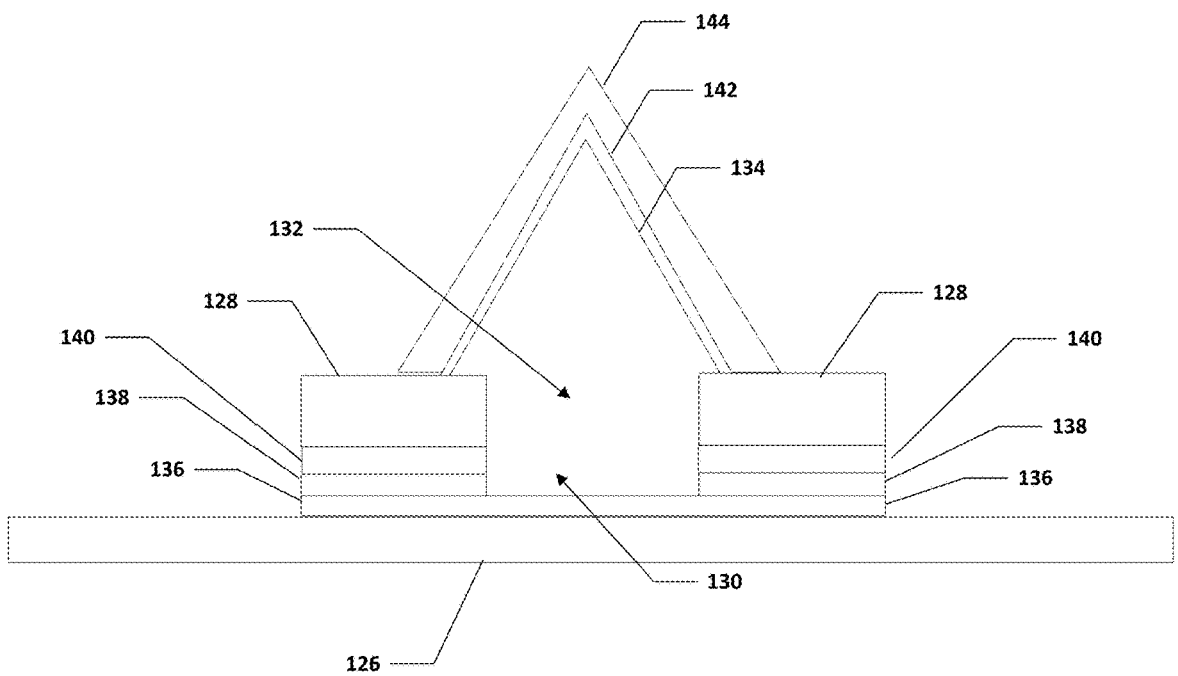
FIG. 5D is a simplified block diagram illustrating example details of a portion of a system to enable a display with distributed LED backlight, in accordance with an embodiment of the present disclosure.

Turning to FIG. 5D, FIG. 5D is a simplified block diagram illustrating example details of a part of the process of growing nano-pyramid LED 122 on wafer 124. In an example, wafer 124 can include substrate layer 126. Aluminum nitride layer 136 can be over substrate layer 126. Metal nitride layer 138 can be over aluminum nitride layer 136. Silicon dioxide layer 140 can be over aluminum nitride layer 136. Silicon nitride layer 128 can be over silicon dioxide layer 140. Silicon nitride layer 128, metal nitride layer 138, and silicon dioxide layer 140 can form the inner walls of cavity 130. Nano-pyramid stem 132 can be grown in cavity 130 and nano-pyramid body 134 can be grown above silicon nitride layer 128. Indium gallium nitride/gallium nitride quantum well 142 can be grown over nano-pyramid body 134.

As illustrated in FIG. 5D, a P-gallium nitride layer 144 can be grown over indium gallium nitride/gallium nitride quantum well 142. P-gallium nitride layer 144 can help to provide holes to the active layer of indium gallium nitride/gallium nitride quantum well 142 to allow for the emission of light. In an example, P-gallium nitride layer 144 can be grown using the MOVPE process that was used to grow nano-pyramid stem 132, nano-pyramid body 134, and indium gallium nitride/gallium nitride quantum well 142 or some other type of process that will grow P-gallium nitride layer 144 over indium gallium nitride/gallium nitride quantum well 142.

Figure 5E:
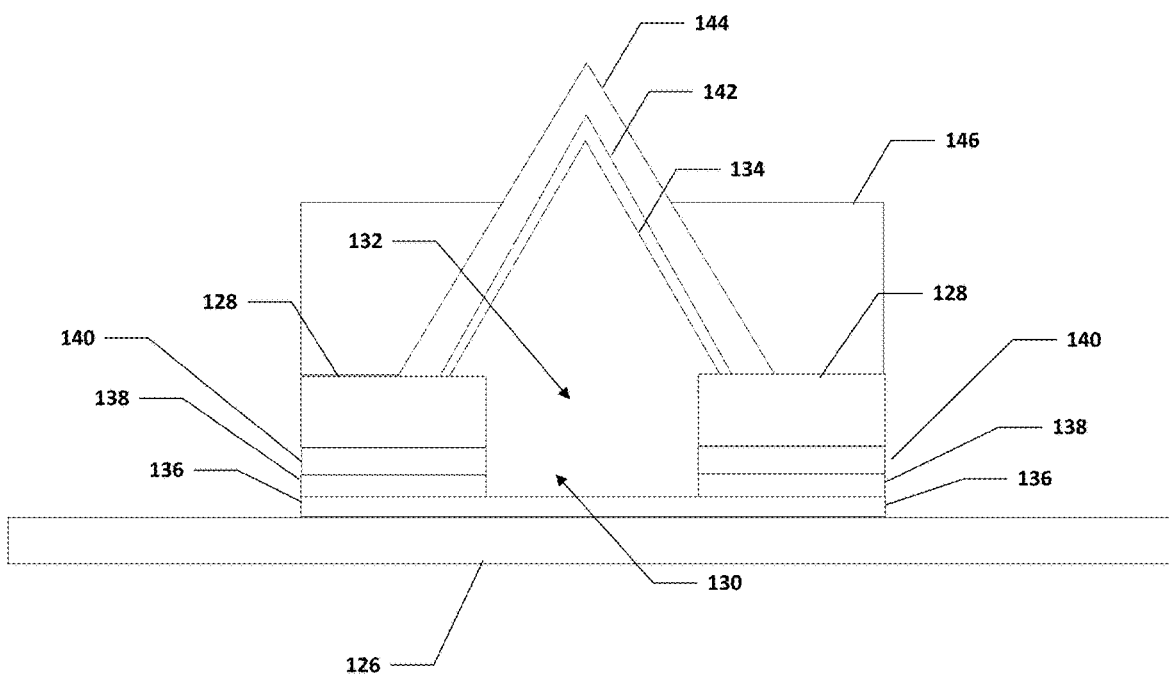
FIG. 5E is a simplified block diagram illustrating example details of a portion of a system to enable a display with distributed LED backlight, in accordance with an embodiment of the present disclosure.

Turning to FIG. 5E, FIG. 5E is a simplified block diagram illustrating example details of a part of the process of growing nano-pyramid LED 122 on wafer 124. In an example, wafer 124 can include substrate layer 126. Aluminum nitride layer 136 can be over substrate layer 126. Metal nitride layer 138 can be over aluminum nitride layer 136. Silicon dioxide layer 140 can be over aluminum nitride layer 136. Silicon nitride layer 128 can be over silicon dioxide layer 140. Silicon nitride layer 128, metal nitride layer 138, and silicon dioxide layer 140 can form the inner walls of cavity 130. Nano-pyramid stem 132 can be grown in cavity 130 and nano-pyramid body 134 can be grown above silicon nitride layer 128. Indium gallium nitride/gallium nitride quantum well 142 can be grown over nano-pyramid body 134. P-gallium nitride layer 144 can be grown over indium gallium nitride/gallium nitride quantum well 142.

As illustrated in FIG. 5E, a second silicon dioxide layer 146 can be added over silicon nitride layer 128. Second silicon dioxide layer 146 is an insulating layer and can be comprised of silicon nitride, silicon oxynitride, carbon-doped oxide, or some other material that can provide an insulating layer. In an example, second silicon dioxide layer 146 can be added over silicon nitride layer 128 using plasma enhanced chemical vapor deposition (PECVD) or some other type of process that will create second silicon dioxide layer 146 over silicon nitride layer 128.

Figure 5F:
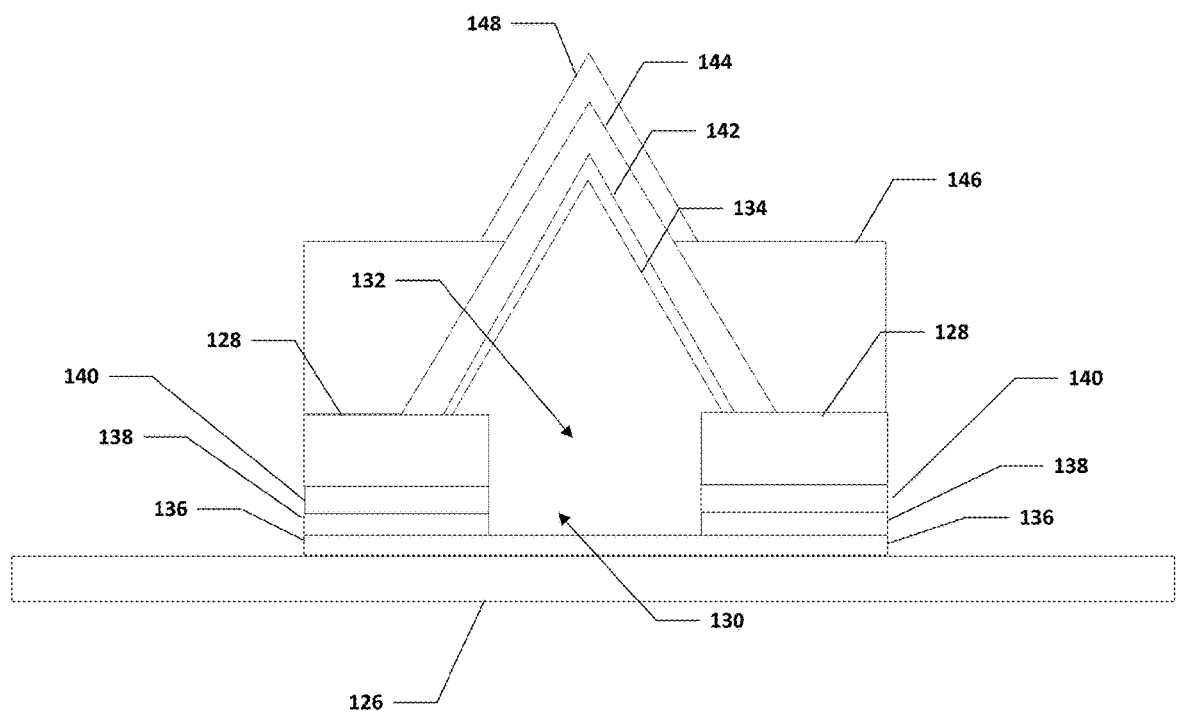
FIG. 5F is a simplified block diagram illustrating example details of a portion of a system to enable a display with distributed LED backlight, in accordance with an embodiment of the present disclosure.

Turning to FIG. 5F, FIG. 5F is a simplified block diagram illustrating example details of a part of the process of growing nano-pyramid LED 122 on wafer 124. In an example, wafer 124 can include substrate layer 126. Aluminum nitride layer 136 can be over substrate layer 126. Metal nitride layer 138 can be over aluminum nitride layer 136. Silicon dioxide layer 140 can be over aluminum nitride layer 136. Silicon nitride layer 128 can be over silicon dioxide layer 140. Silicon nitride layer 128, metal nitride layer 138, and silicon dioxide layer 140 can form the inner walls of cavity 130. Nano-pyramid stem 132 can be grown in cavity 130 and nano-pyramid body 134 can be grown above silicon nitride layer 128. Indium gallium nitride/gallium nitride quantum well 142 can be grown over nano-pyramid body 134. P-gallium nitride layer 144 can be grown over indium gallium nitride/gallium nitride quantum well 142. Second silicon dioxide layer 146 can be added over silicon nitride layer 128.

As illustrated in FIG. 5F, a nickel adhesion layer 148 can be added over P-gallium nitride layer 144. Nickel adhesion layer 148 helps to ensure good ohmic contact with P-gallium nitride layer 144 and can be comprised of palladium, platinum, silver, or some other material that can help to ensure good ohmic contact with P-gallium nitride layer 144. In an example, nickel adhesion layer 148 can be added over P-gallium nitride layer 144 using sputtering, physical vapor deposition (PVD), or some other type of process that will create nickel adhesion layer 148 over P-gallium nitride layer 144.

Figure 5G:
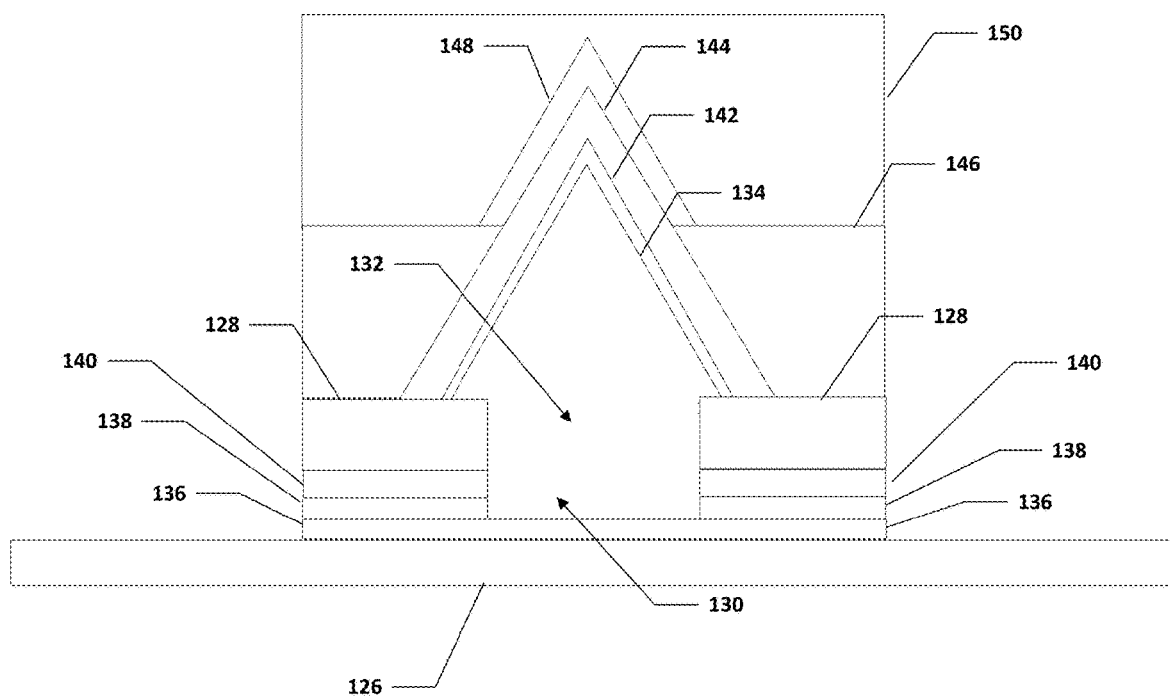
FIG. 5G is a simplified block diagram illustrating example details of a portion of a system to enable a display with distributed LED backlight, in accordance with an embodiment of the present disclosure.

Turning to FIG. 5G, FIG. 5G is a simplified block diagram illustrating example details of a part of the process of growing nano-pyramid LED 122 on wafer 124. In an example, wafer 124 can include substrate layer 126. Aluminum nitride layer 136 can be over substrate layer 126. Metal nitride layer 138 can be over aluminum nitride layer 136. Silicon dioxide layer 140 can be over aluminum nitride layer 136. Silicon nitride layer 128 can be over silicon dioxide layer 140. Silicon nitride layer 128, metal nitride layer 138, and silicon dioxide layer 140 can form the inner walls of cavity 130. Nano-pyramid stem 132 can be grown cavity 130 and nano-pyramid body 134 can be grown above silicon nitride layer 128. Indium gallium nitride/gallium nitride quantum well 142 can be grown over nano-pyramid body 134. P-gallium nitride layer 144 can be grown over indium gallium nitride/gallium nitride quantum well 142. Second silicon dioxide layer 146 can be added over silicon nitride layer 128. Nickel adhesion layer 148 can be added over P-gallium nitride layer 144.

As illustrated in FIG. 5G, an aluminum silicon layer 150 can be added over second silicon dioxide layer 146. Aluminum silicon layer 150 can function as the mirror for nano-pyramid LED 122. Aluminum silicon layer 150 can be comprised of aluminum and silicon (e.g., about 97% to about 99% aluminum and 1% to about 3% silicon). In an example, aluminum silicon layer 150 can be added over second silicon dioxide layer 146 using sputtering, PVD or some other type of process that will create aluminum silicon layer 150 over second silicon dioxide layer 146.

Figure 5H:
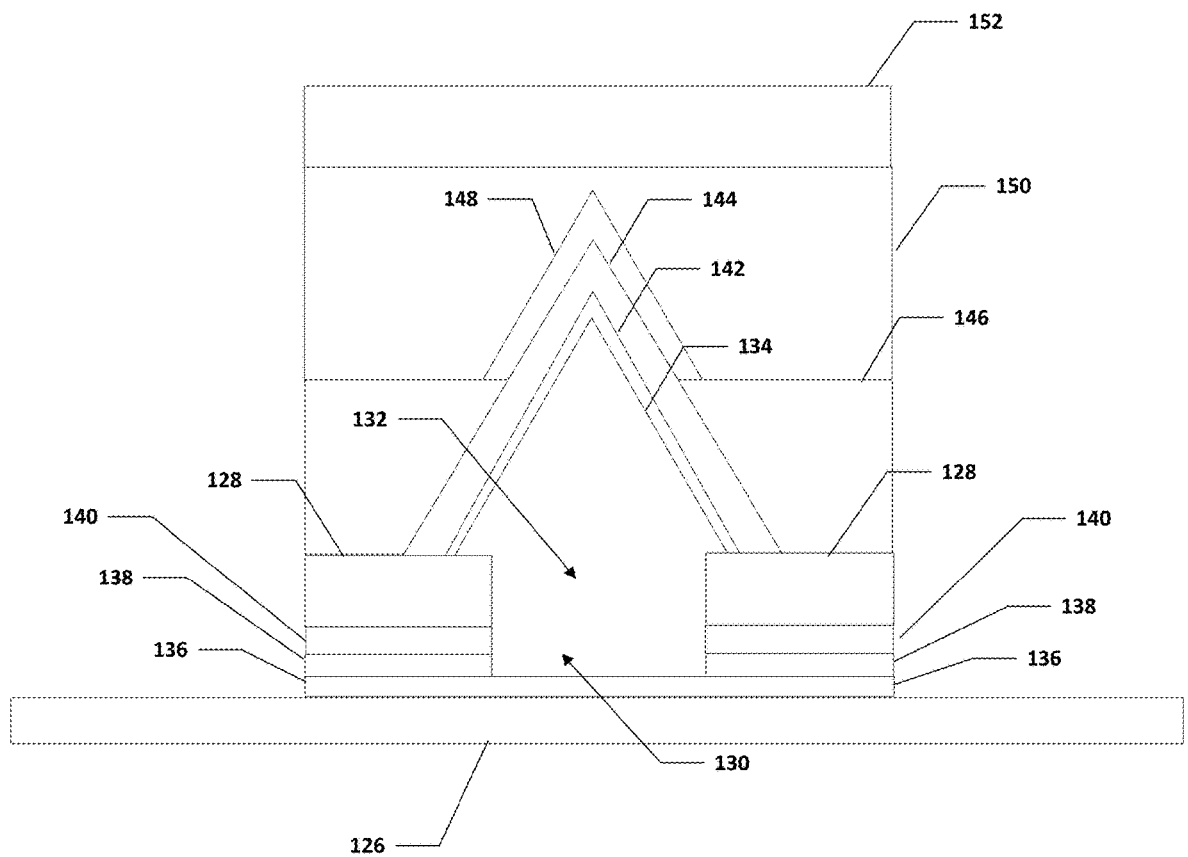
FIG. 5H is a simplified block diagram illustrating example details of a portion of a system to enable a display with distributed LED backlight, in accordance with an embodiment of the present disclosure.

Turning to FIG. 5H, FIG. 5H is a simplified block diagram illustrating example details of a part of the process of growing nano-pyramid LED 122 on wafer 124. In an example, wafer 124 can include substrate layer 126. Aluminum nitride layer 136 can be over substrate layer 126. Metal nitride layer 138 can be over aluminum nitride layer 136. Silicon dioxide layer 140 can be over aluminum nitride layer 136. Silicon nitride layer 128 can be over silicon dioxide layer 140. Silicon nitride layer 128, metal nitride layer 138, and silicon dioxide layer 140 can form the inner walls of cavity 130. Nano-pyramid stem 132 can be grown in cavity 130 and nano-pyramid body 134 can be grown above silicon nitride layer 128. Indium gallium nitride/gallium nitride quantum well 142 can be grown over nano-pyramid body 134. P-gallium nitride layer 144 can be grown over indium gallium nitride/gallium nitride quantum well 142. Second silicon dioxide layer 146 can be added over silicon nitride layer 128. Nickel adhesion layer 148 can be added over P-gallium nitride layer 144. Aluminum silicon layer 150 can be added over second silicon dioxide layer 146.

As illustrated in FIG. 5H, receiving pad coupling layer 152 can be added over aluminum silicon layer 150. Receiving pad coupling layer 152 can couple with the receiving pad on the backplane in the area of the backplane where the nano-pyramid is to be added. Receiving pad coupling layer 152 can be comprised of copper or a copper aluminum alloy, cobalt, molybdenum, titanium nitride, gold, silver, or some other material that will couple with the receiving pad on the backplane in the area of the backplane where the nano-pyramid is to be added. In an example, receiving pad coupling layer 152 can be added over aluminum silicon layer 150.

Figure 6A:
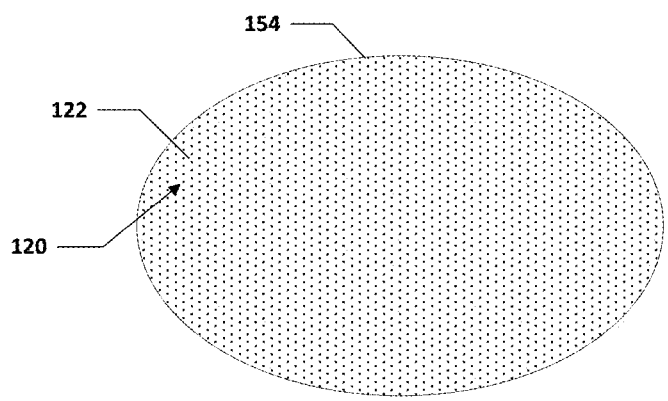
FIG. 6A is a simplified block diagram illustrating example details of a portion of a system to enable a display with distributed LED backlight, in accordance with an embodiment of the present disclosure.

Turning to FIG. 6A, FIG. 6A is a simplified block diagram of nano-pyramids on a wafer. More specifically, as illustrated in FIG. 6A, a plurality of nano-pyramid LEDs 122 can be grown on a wafer 154. A plurality of nano-pyramid LEDs 122 can be used to create a microLED 120.

Figure 6B:
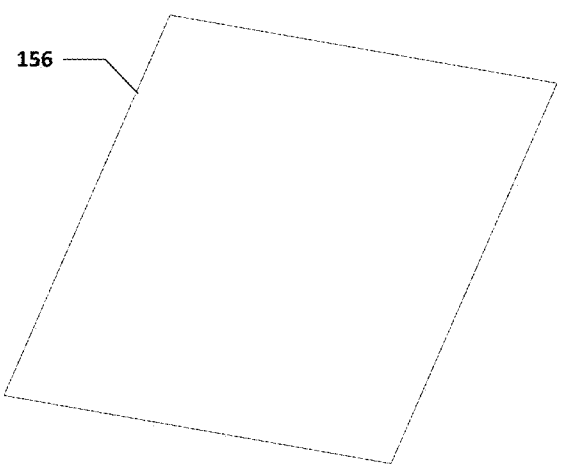
FIG. 6B is a simplified block diagram illustrating example details of a portion of a system to enable a display with distributed LED backlight, in accordance with an embodiment of the present disclosure.

Turning to FIG. 6B, FIG. 6B is a simplified block diagram of a backplane 156 for a display. Backplane 156 can be the backplane for display 108. Backplane 156 can include the routing for the individual connection points in display and connect the individual connection points to the driver control circuitry (e.g., column driver, row driver, timing controller, etc.).

In an example, backplane 156 can be a thin-film-transistor backplane. More specifically, backplane 156 can be a special type of metal-oxide-semiconductor field-effect transistor (MOSFET) made by depositing thin films of an active semiconductor layer as well as a dielectric layer and metallic contacts over a supporting (but non-conducting) substrate. Transistors are embedded within the panel itself, reducing crosstalk between pixels in display 108a and improving image stability. Backplane 156 can be used to control the microLEDs (e.g., microLEDs 120a-120c), especially for local dimming.

Figure 6C:
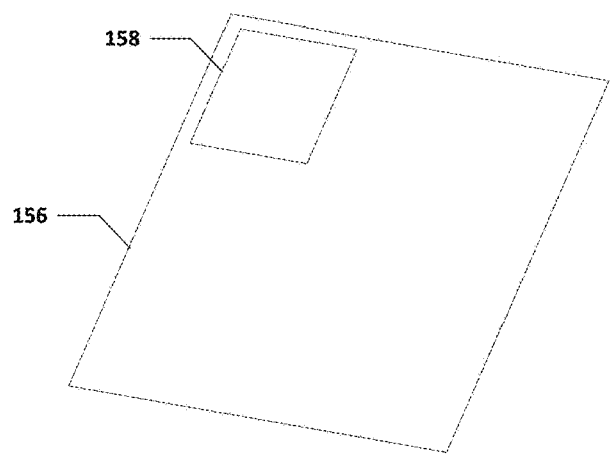
FIG. 6C is a simplified block diagram illustrating example details of a portion of a system to enable a display with distributed LED backlight, in accordance with an embodiment of the present disclosure.

Turning to FIG. 6C, FIG. 6C is a simplified block diagram of backplane 156. As illustrated in FIG. 5C, a microLED receiving pad 158 can be added to backplane 156. MicroLED receiving pad 158 can be a copper receiving pad or some other material that will bond to a group of nano-pyramid LEDs 122 on wafer 154 (illustrated in FIG. 6A).

Figure 6D:
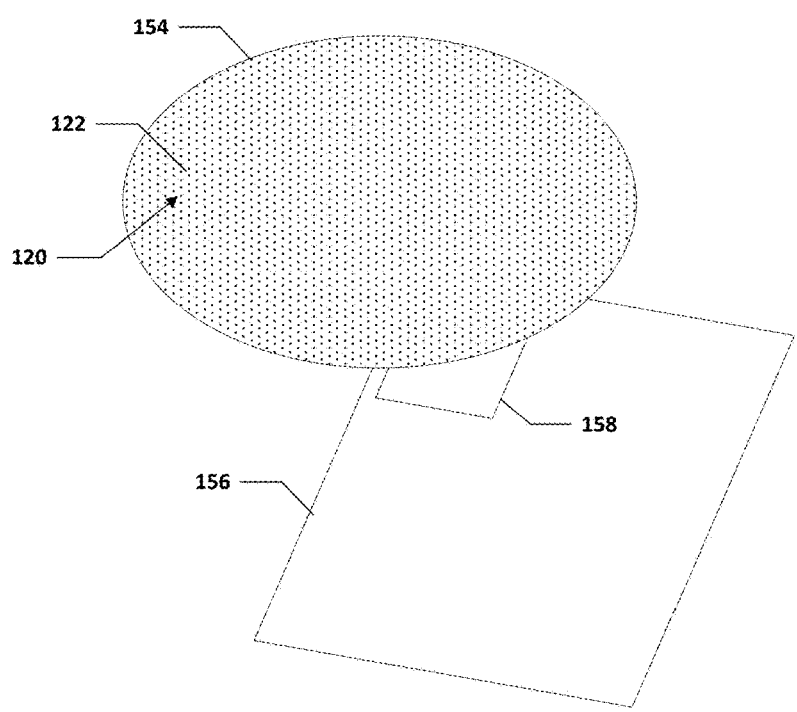
FIG. 6D is a simplified block diagram illustrating example details of a portion of a system to enable a display with distributed LED backlight, in accordance with an embodiment of the present disclosure.

Turning to FIG. 6D, FIG. 6D is a simplified block diagram of backplane 156. As illustrated in FIG. 6D, microLED receiving pad 158 has been added to backplane 156. Wafer 154, with a group of nano-pyramid LEDs 122 that can be used to create a microLED 120, can be positioned over backplane 156 in the area of backplane 156 that includes microLED receiving pad 158.

Figure 6E:
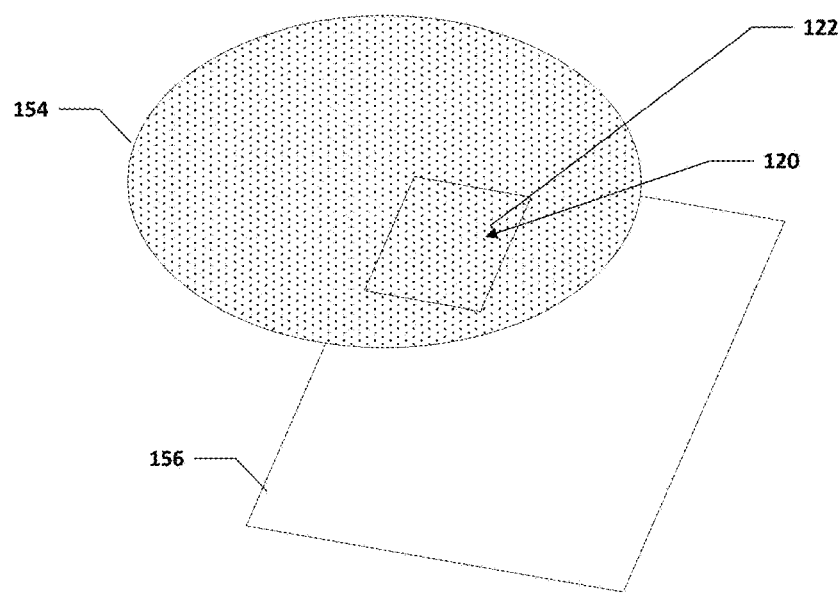
FIG. 6E is a simplified block diagram illustrating example details of a portion of a system to enable a display with distributed LED backlight, in accordance with an embodiment of the present disclosure.

Turning to FIG. 6E, FIG. 6E is a simplified block diagram of wafer 154 with a group of nano-pyramid LEDs 122 that can be used to create a microLED 120 on backplane 156. As illustrated in FIG. 6E, wafer 154, with a group of nano-pyramid LEDs 122 that can be used to create a microLED 120, can be positioned over backplane 156 in the area of backplane 156 that includes microLED receiving pad 158 (not shown). Nano-pyramid LEDs 122 from wafer 154 can be bonded to backplane 156 in the area that includes receiving microLED receiving pad 158 (not shown).

Figure 6F:
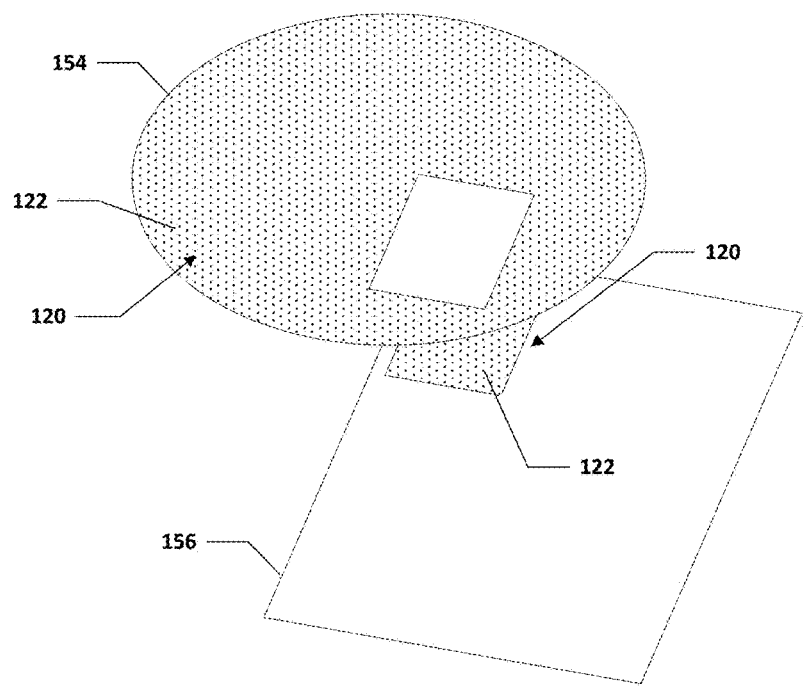
FIG. 6F is a simplified block diagram illustrating example details of a portion of a system to enable a display with distributed LED backlight, in accordance with an embodiment of the present disclosure.

Turning to FIG. 6F, FIG. 6F is a simplified block diagram of a group of nano-pyramid LEDs 122 on backplane 156 that are used to create microLED 120. After nano-pyramid LEDs 122 have been bonded to microLED receiving pad 158 (not shown), wafer 154 can be removed from backplane 156. Nano-pyramid LEDs 122 will be bonded to backplane 156 to create microLED 120. Nano-pyramid LEDs 122 in the areas of wafer 154 where nano-pyramid LEDs 122 remain can be used to bond with another backplane or can be used to add more nano-pyramid LEDs 122 to backplane 156 and create more microLEDs 120.

Figure 6G:
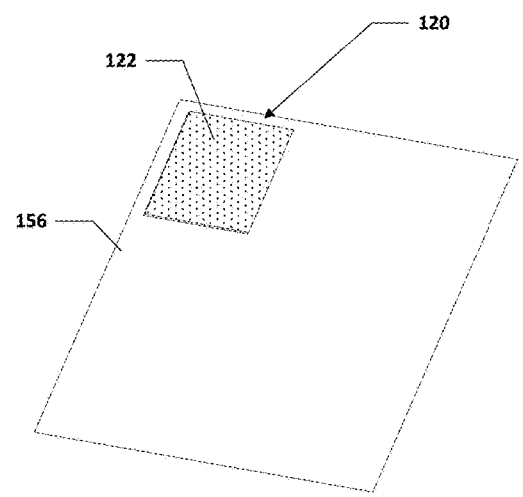
FIG. 6G is a simplified block diagram illustrating example details of a portion of a system to enable a display with distributed LED backlight, in accordance with an embodiment of the present disclosure.

Turning to FIG. 6G, FIG. 6G is a simplified block diagram of a group of nano-pyramid LEDs 122 on backplane 156 that are used to create microLED 120. Nano-pyramid LEDs 122 can be connected together to make one or more microLEDs 120 that each include tens of nano-pyramids, hundreds of nano-pyramids, thousands of nano-pyramids, or millions of nano-pyramids. The advantage of that is if one nano-pyramid LED (or 10 nano-pyramid LEDs or more) is not functional, the rest of the nano-pyramid LEDs can still function. That gives a significant advantage in terms of yields and cost. Also, with nano-pyramid LEDs, red light emitting nano-pyramid LEDs, green light emitting nano-pyramid LEDs, and blue light emitting nano-pyramid LEDs can all be created or grown on the same wafer.

Figure 7:
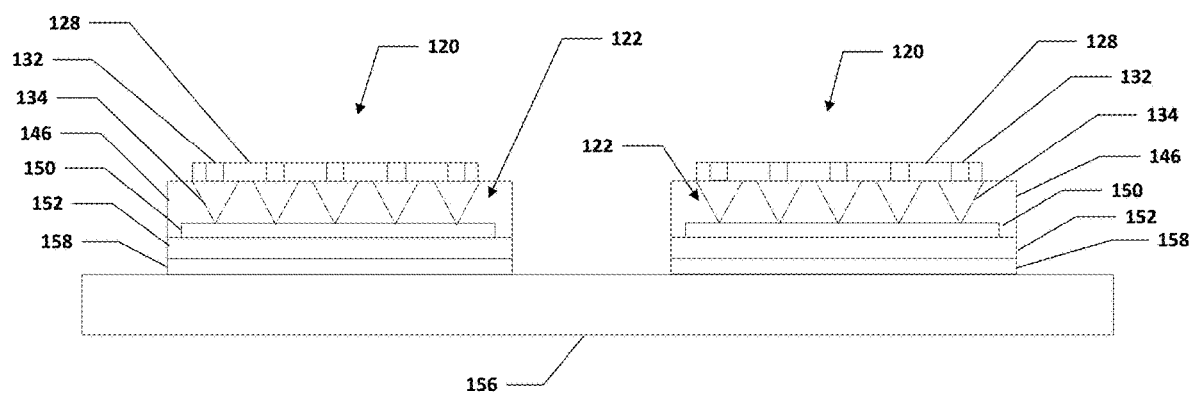
FIG. 7 is a simplified block diagram illustrating example details of a portion of a system to enable a display with distributed LED backlight, in accordance with an embodiment of the present disclosure.

Turning to FIG. 7, FIG. 7 is a simplified diagram of display 108 with nano-pyramid LEDs, in accordance with an embodiment of the present disclosure. In an example, display 108 can include a plurality of microLEDs 120. Each microLED 120 can include a plurality of nano-pyramid LEDs 122.

In an example, plurality of microLEDs 120 can be on backplane 156. Backplane 156 can be the backplane for display 108 and can include the routing for the individual connection points in display and connect the individual connection points to the driver control circuitry (e.g., column driver, row driver, timing controller, etc.). Each microLED 120 can include a plurality of nano-pyramid LEDs 122. Each plurality of nano-pyramid LEDs 122 can include nano-pyramid stem 132 and nano-pyramid body 134. Silicon nitride layer 128 can help support and insulate each nano-pyramid stem 132. Second silicon dioxide layer 146 can help support and insulate each nano-pyramid body 134. Aluminum silicon layer 150 can be under each nano-pyramid body 134 and function as a mirror to reflect light from each nano-pyramid. Receiving pad coupling layer 152 can be under to aluminum silicon layer 150 and help couple microLED 120 to microLED receiving pad 158 and backplane 156.

Figure 8:
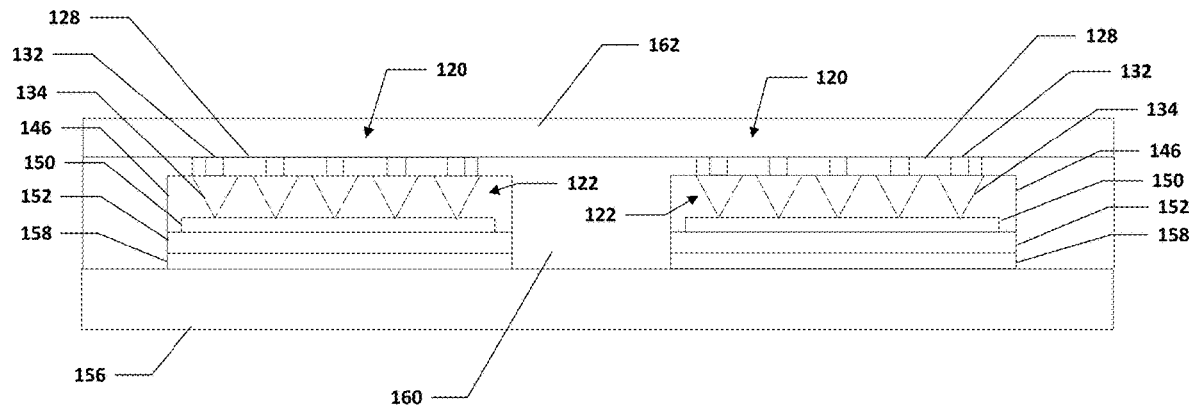
FIG. 8 is a simplified block diagram illustrating example details of a portion of a system to enable a display with distributed LED backlight, in accordance with an embodiment of the present disclosure.

Turning to FIG. 8, FIG. 8 is a simplified diagram of display 108 with nano-pyramid LEDs, in accordance with an embodiment of the present disclosure. In an example, display 108 can include a plurality of microLEDs 120. Each microLED 120 can include a plurality of nano-pyramid LEDs 122.

In an example, the plurality of microLEDs 120 can be on backplane 156. Backplane 156 can be the backplane for display 108 and can include the routing for the individual connection points in display and connect the individual connection points to the driver control circuitry (e.g., column driver, row driver, timing controller, etc.). Each microLED 120 can include a plurality of nano-pyramid LEDs 122. Each plurality of nano-pyramid LEDs 122 can include nano-pyramid stem 132 and nano-pyramid body 134. Silicon nitride layer 128 can help support and insulate each nano-pyramid stem 132. Second silicon dioxide layer 146 can help support and insulate each nano-pyramid body 134. Aluminum silicon layer 150 can be under each nano-pyramid body 134 and function as a mirror to reflect light from each nano-pyramid. Receiving pad coupling layer 152 can be under to aluminum silicon layer 150 and help couple microLED 120 to microLED receiving pad 158 and backplane 156. Insulator 160 can help insulate each microLED 120 on backplane 156. Insulator 160 may be resin, polyimide, an oxide, or some other material that can insulate each microLED 120 on backplane 156. An indium tin oxide (ITO) layer 162 can be created over microLEDs 120. ITO layer 162 is a conductive transparent layer and can be comprised of ITO or any other transparent conductive material that can help protect microLEDs 120. Each microLED 120 has an anode terminal in nano-pyramid body 134 electrically coupled to microLED receiving pad 158 and backplane 156 and a cathode terminal in nano-pyramid stem 132 electrically coupled to ITO layer 162.

Figure 9:
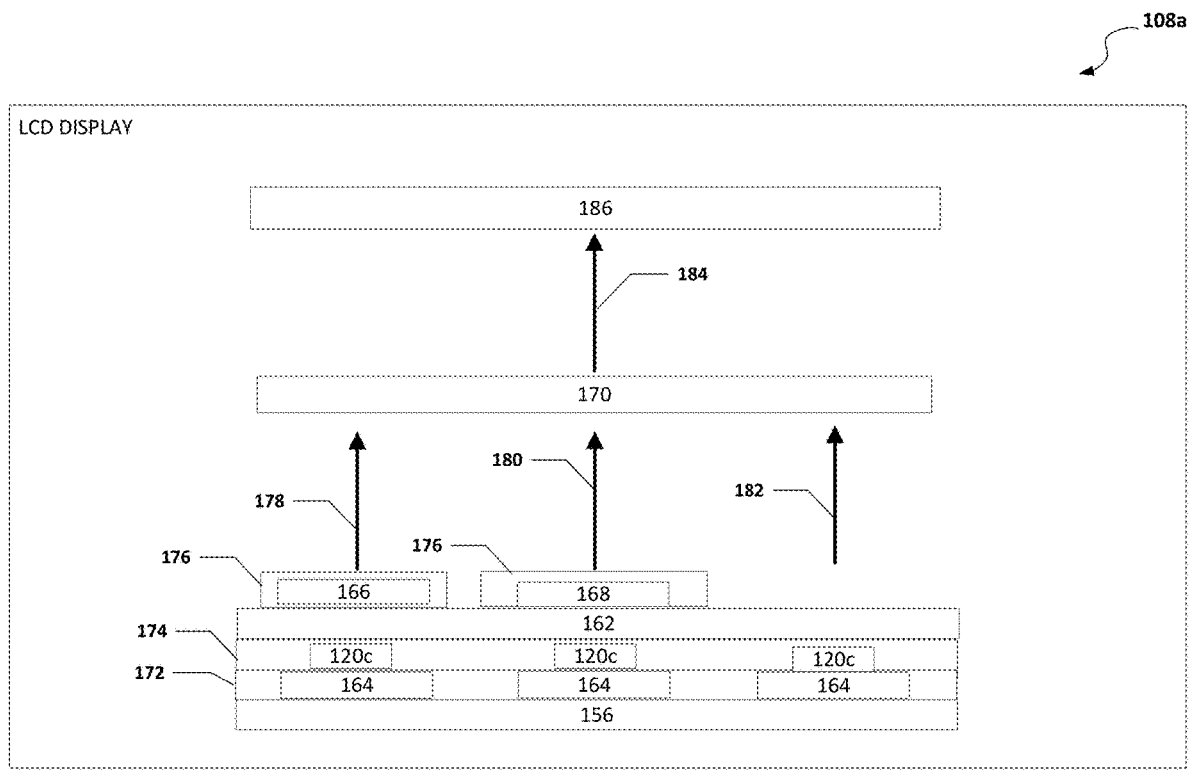
FIG. 9 is a simplified block diagram illustrating example details of a portion of a system to enable a display with distributed LED backlight, in accordance with an embodiment of the present disclosure.

Turning to FIG. 9, FIG. 9 is a simplified block diagram of a display 108*a* with a distributed LED backlight, in accordance with an embodiment of the present disclosure. In an example, display 108*a* can include backplane 156, mirrors 164, microLEDs 120*c*, ITO layer 162, red quantum dot film 166, green quantum dot film 168, diffuser 170, and liquid crystal array and filters 186. Backplane 156 can be a thin-film-transistor backplane. More specifically, backplane 156 can be a special type of metal-oxide-semiconductor field-effect transistor (MOSFET) made by depositing thin films of an active semiconductor layer as well as a dielectric layer and metallic contacts over a supporting (but non-conducting) substrate. Transistors are embedded within the panel itself, reducing crosstalk between pixels in display 108*a* and improving image stability. Backplane 156 can be used to control microLEDs 120*c*, especially for local dimming.

Mirrors 164 can be over backplane 156. Mirrors 164 can be comprised of aluminum, silver, or anything material that will reflect the light from microLEDs 120*c* towards diffuser 170. Mirrors 164 may be aluminum silicon layer 150. Mirrors 164 can be supported by a mirror support material 172 and mirror support material 172 helps to hold mirrors 164 in place. MicroLEDs 120*c* can be over mirrors 164 such that light from microLEDs 120*c* is reflected by mirrors 164 towards diffuser 170.

In an example, each of microLEDs 120*c* can be a blue microLED. MicroLEDs 120*c* can be in microLED protective layer 174. In an example, microLED protective layer 174 is a dialectic material between each microLED 120*c* or some other non-conducive substrate material that can help keep microLEDs intact and isolated. ITO layer 162 is over microLEDs 120*c* and is a conductive transparent layer. In an example, ITO layer 162 is comprised of ITO but ITO layer 162 an be comprised of any transparent conductive material. Red quantum dot film 166 and green quantum dot film 168 can be in a quantum dot film protection layer 176. Quantum dots are mixed in an organic material for the quantum dot film and if oxygen and/or moisture go through the quantum dots it degrades the performance of the quantum dot film. Quantum dot film protection layer 176 can help to protect red quantum dot film 166 and green quantum dot film 168. Quantum dot film protection layer 176 can be a single layer over each of red quantum dot film 166 and green quantum dot film 168 or may be broken up into individual quantum dot film protection layers as illustrated in FIG. 9.

As illustrated in FIG. 9, red quantum dot film 166 is over ITO layer 162 and microLED 120*c*. When light from microLED 120*c* passes through red quantum dot film 166, the light is converted to red colored light 178. For example, microLED 120*c* can be a blue LED that emits blue light but when the blue light passes through red quantum dot film 166, the blue light is converted to red colored light 178. Also, as illustrated in FIG. 9, green quantum dot film 168 is over ITO layer 162 and microLED 120*c*. When light from microLED 120*c* passes through green quantum dot film 168, the light is converted to green colored light 180. For example, microLED 120*c* can be a blue LED that emits blue light but when the blue light passes through green quantum dot film 168, the blue light is converted to green colored light 180. MicroLED 120*c* can be a blue LED that emits blue colored light 182. Red colored light 178, green colored light 180, and blue colored light 182 can be combined by diffuser 170 to create white light 184. White light 184 can be used as a backlight for a liquid crystal array and filters 186 in display 108*a*.

Figure 10:
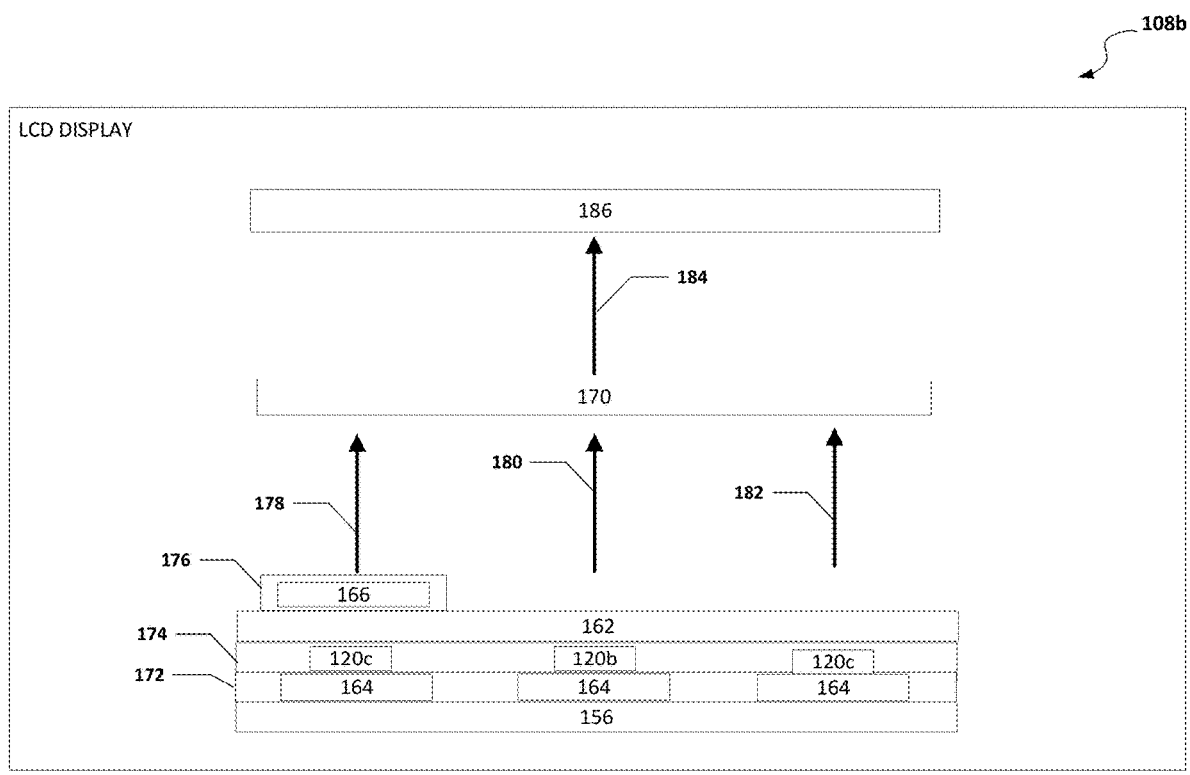
FIG. 10 is a simplified block diagram illustrating example details of a portion of a system to enable a display with distributed LED backlight, in accordance with an embodiment of the present disclosure.

Turning to FIG. 10, FIG. 10 is a simplified block diagram of a display 108*b* with a distributed LED backlight, in accordance with an embodiment of the present disclosure. In an example, display 108*b* can include backplane 156, mirrors 164, microLEDs 120*b* and 120*c*, ITO layer 162, red quantum dot film 166, diffuser 170, and liquid crystal array and filters 186. Backplane 156 can be used to control microLEDs 120*b* and 120*c*, especially for local dimming.

Mirrors 164 can be over backplane 156. Mirrors 164 can be comprised of aluminum, silver, or anything material that will reflect the light from microLEDs 120*b* and 120*b* towards diffuser 170. Mirrors 164 can be supported by mirror support material 172. MicroLEDs 120*b* and 120*c* can be over mirrors 164 such that light from microLEDs 120*b* and 120*c* is reflected by mirrors 164 towards diffuser 170. MicroLEDs 120*c* can be a blue microLED. MicroLED 120*b* can be over mirrors 164 such that light from microLED 120*b* is reflected by mirrors 164 towards diffuser 170. MicroLED 120*b* can be a green microLED. MicroLEDs 120*b* and 120*c* can be in microLED protective layer 174. In an example, microLED protective layer 174 is a dialectic material between each microLED 120*b* and 120*c* or some other non-conducive substrate material that can help keep LEDs intact and isolated. ITO layer 162 is over microLEDs 120*b* and 120*c* and is a conductive transparent layer. Red quantum dot film 166 can be in a quantum dot film protection layer 176.

As illustrated in FIG. 10, red quantum dot film 166 is over ITO layer 162 and microLED 120*c*. When light from microLED 120*c* passes through red quantum dot film 166, the light is converted to red colored light 178. For example, microLED 120*c* can be a blue LED that emits blue light but when the blue light passes through red quantum dot film 166, the blue light is converted to red colored light 178. MicroLED 120*b* can be a green LED that emits greed colored light 180. MicroLED 120*c* can be a blue LED that emits blue colored light 182. Red colored light 178, green colored light 180, and blue colored light 182 can be combined by diffuser 170 to create white light 184. White light 184 can be used as a backlight for liquid crystal array and filters 186 in display 108*b*.

Figure 11:
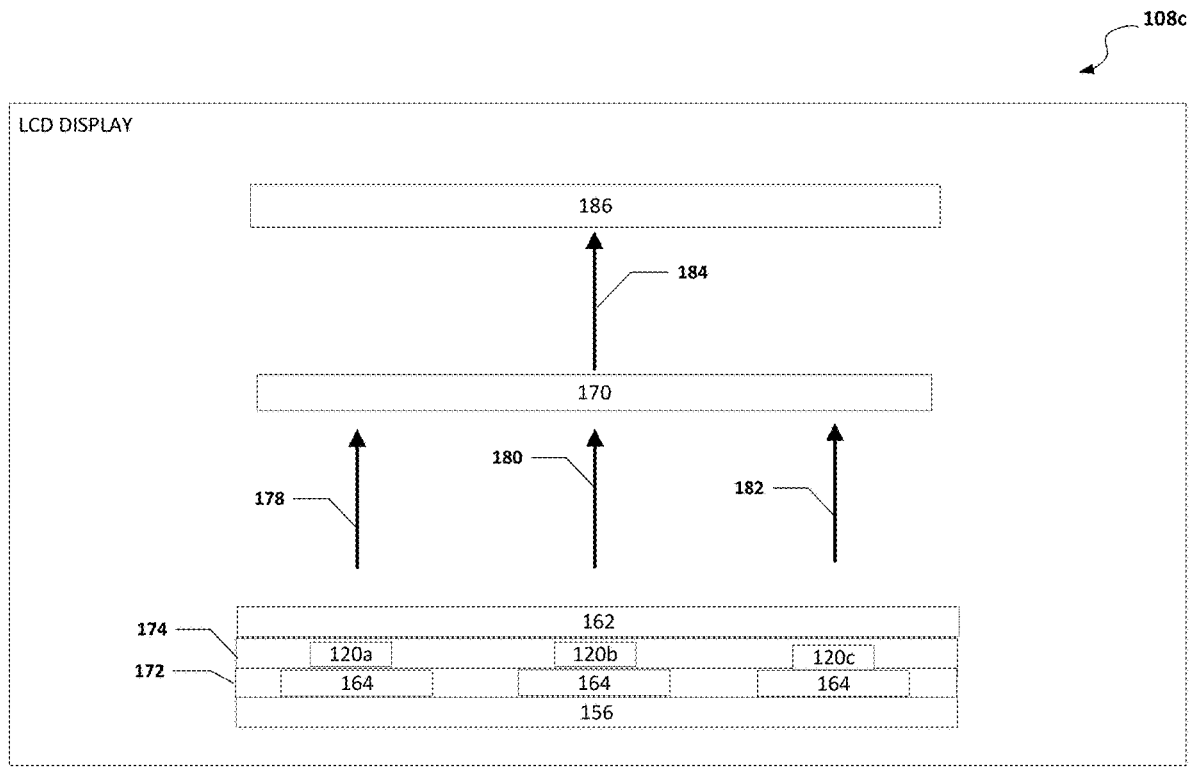
FIG. 11 is a simplified block diagram illustrating example details of a portion of a system to enable a display with distributed LED backlight, in accordance with an embodiment of the present disclosure.

Turning to FIG. 11, FIG. 11 is a simplified block diagram of a display 108*c* with distributed LED backlight, in accordance with an embodiment of the present disclosure. In an example, display 108*c* can include backplane 156, mirrors 164, microLED s120a-120c, ITO layer 162, diffuser 170, and liquid crystal array and filters 186. Backplane 156 can be used to control microLEDs 120a-120c, especially for local dimming.

Mirrors 164 can be over backplane 156. Mirrors 164 can be comprised of aluminum, silver, or anything material that will reflect the light from microLED 120a-120c, towards diffuser 170. Mirrors 164 can be supported by mirror support material 172. MicroLEDs 120a-120c can be over mirrors 164 such that light from microLEDs 120a-120c is reflected by mirrors 164 towards diffuser 170. MicroLED 120a can be a red microLED. MicroLED 120b can be a green microLED. MicroLED 120c can be a blue microLED. MicroLEDs 120a-120c, can be in microLED protective layer 174. ITO layer 162 is over microLEDs 120a-120c and is a conductive transparent layer.

As illustrated in FIG. 11, microLED 120a can be a red microLED that emits red colored light 178. In addition, microLED 120b can be a green microLED that emits greed colored light 180. Also, microLED 120c can be a blue microLED that emits blue colored light 182. Red colored light 178, green colored light 180, and blue colored light 182 can be combined by diffuser 170 to create white light 184. White light 184 can be used as a backlight for a liquid crystal array and filters 186 in display 108c.

Figure 12:
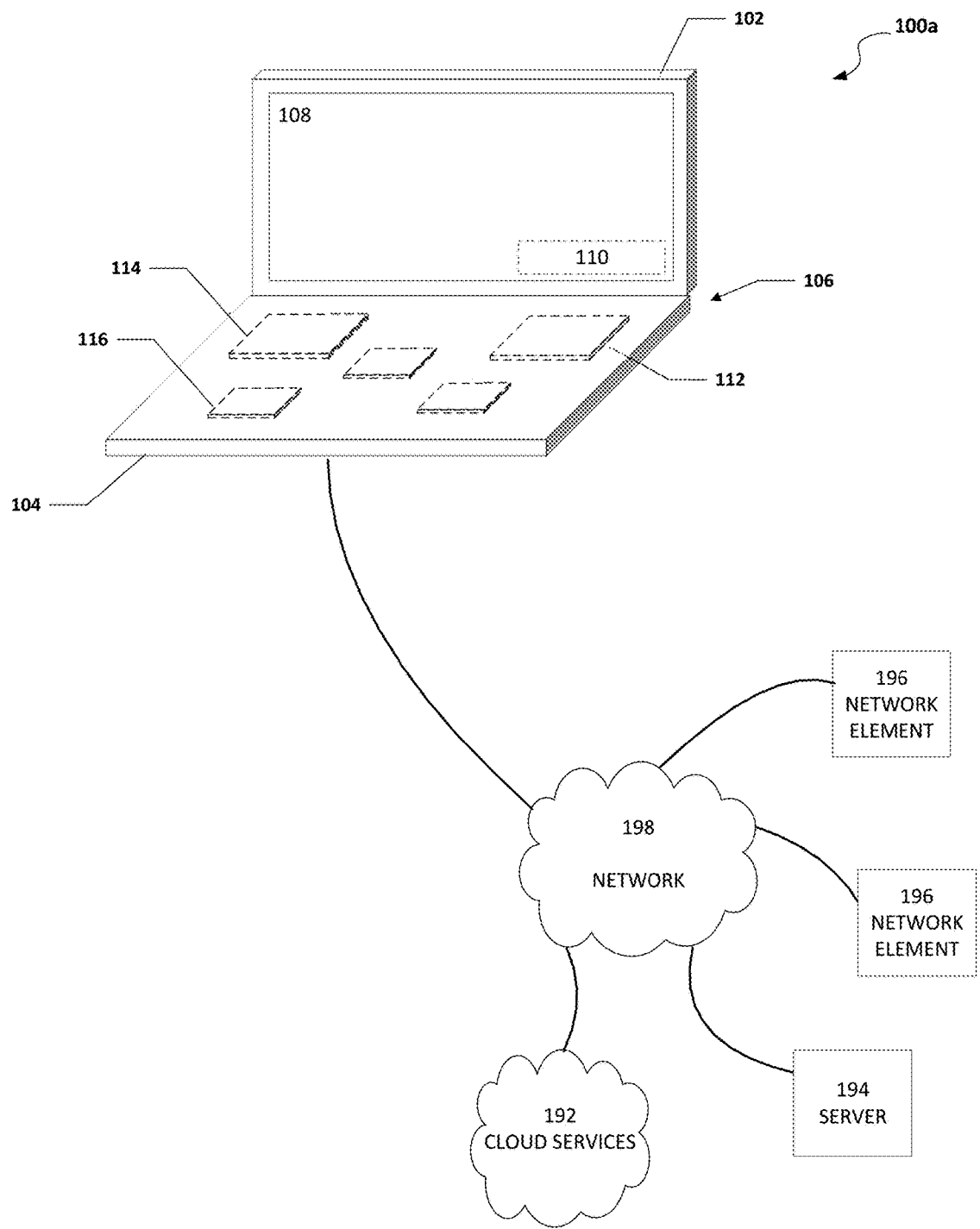
FIG. 12 is a simplified block diagram illustrating an example of an electronic device that includes a display with distributed LED backlight, in accordance with an embodiment of the present disclosure.

Turning to FIG. 12, FIG. 12 is a simplified block diagram of electronic device 100a configured to enable a display with nano-pyramid light emitting diodes (LEDs), in accordance with an embodiment of the present disclosure. In an example, electronic device 100a can include first housing 102 and second housing 104. First housing 102 can be pivotably coupled to second housing 104 using hinge 106. First housing 102 can include display 108 and TCON 110. Second housing 104 can include keyboard (not shown), memory 112, one or more processors 114, and one or more electronic components 116. TCON 110 is a timing controller on the display side. One or more processors 114 can include a display engine. One or more electronic components 116 can be a device or group of devices available to assist in the operation or function of electronic device 100a. Electronic devices 102a (and 102b and 102c), may be in communication with cloud services 192, server 194, and/or one or more network elements 196 using network 198. In some examples, electronic device 102a (and 102b and 102c), may be standalone devices and not connected to network 198 or another device.

Elements of FIG. 12 may be coupled to one another through one or more interfaces employing any suitable connections (wired or wireless), which provide viable pathways for network (e.g., network 198, etc.) communications. Additionally, any one or more of these elements of FIG. 12 may be combined or removed from the architecture based on particular configuration needs. Electronic devices 100a-100c may include a configuration capable of transmission control protocol/Internet protocol (TCP/IP) communications for the transmission or reception of packets in a network. Electronic devices 100a-100c may also operate in conjunction with a user datagram protocol/IP (UDP/IP) or any other suitable protocol where appropriate and based on particular needs.

Turning to the infrastructure of FIG. 12, generally, the system may be implemented in any type or topology of networks. Network 198 represents a series of points or nodes of interconnected communication paths for receiving and transmitting packets of information that propagate through the system. Network 198 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In the system, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided in the system. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. The data may help determine a status of a network element or network. Additionally, messages, requests, responses, and queries are forms of network traffic, and therefore, may comprise packets, frames, signals, data, etc.

It is important to note that the operations in the preceding diagrams illustrate only some of the possible scenarios and patterns that may be executed. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic devices 102a-102c in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although electronic devices 102a-102c have been illustrated with reference to particular elements and operations that facilitate the communication process, these elements and operations may be replaced by any suitable architecture, protocols, and/or processes that achieve the intended functionality of electronic devices 102a-102c.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example A1, is aa liquid crystal array and a backplane, where the backplane includes a receiving pad, where the backplane generates a backlight created by a plurality of microLEDs and each microLED is comprised of a plurality of nano-pyramid LEDs, where each nano-pyramid has a receiving pad coupling layer that is coupled to the receiving pad on the backplane.

In Example A2, the subject matter of Example A1 can optionally include where an aluminum silicon layer, the receiving pad coupling layer, and the receiving pad, are between each of the plurality of nano-pyramid LEDs and the backplane.

In Example A3, the subject matter of any one of Examples A1-A2 can optionally include where each nano-pyramid LED includes a nano-pyramid stem and a nano-pyramid body.

In Example A4, the subject matter of any one of Examples A1-A3 can optionally include where the nano-pyramid body is between the nano-pyramid stem and the backplane.

In Example A5, the subject matter of any one of Examples A1-A4 can optionally include where an indium gallium nitride layer is located over nano-pyramid body.

In Example A6, the subject matter of any one of Examples A1-A5 can optionally include where the indium gallium nitride layer determines a color of the nano-pyramid LED.

In Example A7, the subject matter of any one of Examples A1-A6 can optionally include where the backplane includes a plurality of blue microLEDs and a plurality of green microLEDs.

In Example A8, the subject matter of any one of Examples A1-A7 can optionally include where the backplane includes a plurality of blue microLEDs, a plurality of green microLEDs, and a plurality of red microLEDs.

Example M1 is a method including generating a blue color light from a blue microLED comprised of a plurality of blue nano-pyramid LEDs and each nano-pyramid has a receiving pad coupling layer that is coupled to a receiving pad on a backplane, generating a green color light from a green microLED comprised of a plurality of green nano-pyramid LEDs, generating a red color light from a second blue microLED comprised of a plurality of blue nano-pyramid LEDs, where the blue light from the second blue microLED passes through a color converting film and is converted to the red light, and passing the blue light, green light, and red light through a diffuser to create a while color light for the backlight of the LCD display.

In Example M2, the subject matter of Example M1 can optionally include using where an aluminum silicon layer, the receiving pad coupling layer, and the receiving pad, is between each of the plurality of nano-pyramid LEDs and the backplane.

In Example M3, the subject matter of any one of the Examples M1-M2 can optionally include where each nano-pyramid LED includes a nano-pyramid stem and a nano-pyramid body.

In Example M4, the subject matter of any one of the Examples M1-M3 can optionally include where an indium gallium nitride layer is located over nano-pyramid body.

In Example M5, the subject matter of any one of the Examples M1-M4 can optionally include where the indium gallium nitride layer determines the color that emits from the nano-pyramid LED.

In Example M6, the subject matter of any one of the Examples M1-M5 can optionally include where the LCD does not include a quantum dot field to generate the light for the backlight.

Example AA1 is an electronic device including memory, one or more processors, and a display, the display including a liquid crystal array and a backplane, where the backplane generates a backlight created by a plurality of microLEDs and each microLED is comprised of a plurality of nano-pyramid LEDs, where each nano-pyramid has a receiving pad coupling layer that is coupled to the receiving pad on the backplane.

In Example AA2, the subject matter of Example AA1 can optionally include where an aluminum silicon layer, the receiving pad coupling layer, and the receiving pad, are between each of the plurality of nano-pyramid LEDs and the backplane.

In Example AA3, the subject matter of any one of the Examples AA1-AA2 can optionally include where each nano-pyramid LED includes a nano-pyramid stem and a nano-pyramid body.

In Example AA4, the subject matter of any one of the Examples AA1-AA3 can optionally include where an indium gallium nitride layer is located over nano-pyramid body.

In Example AA5, the subject matter of any one of the Examples AA1-AA4 can optionally include where the indium gallium nitride layer determines a color of the nano-pyramid LED.

In Example AA6, the subject matter of any one of the Examples AA1-AA5 can optionally include where the backplane includes a plurality of blue microLEDs, a plurality of green microLEDs, and a plurality of red microLEDs.

What is claimed is:

1. A display, comprising:
   a backplane; and
   a plurality of microLEDs formed on the backplane, each of the plurality of microLEDs including an array of nano-pyramid LEDs, wherein each of the nano-pyramid LEDs comprises:
   a nano-pyramid stem containing a trace amount of a transition metal originating from a release layer used during a formation of the array of nano-pyramid LEDs on a donor substrate;
   a nano-pyramid body coupled to the nano-pyramid stem; and
   a mirror layer formed on the nano-pyramid body, wherein tips of the nano-pyramid bodies are in contact with the mirror layer.

2. The display of claim 1, wherein the transition metal comprises titanium, niobium, or tantalum.

3. The display of claim 1, wherein each of the nano-pyramid LEDs comprises:

an adhesion layer formed on the nano-pyramid body and beneath the mirror layer.

4. The display of claim 3, wherein the adhesion layer comprises nickel.

5. The display of claim 3, wherein the adhesion layer prevents diffusion of material from the mirror layer into the nano-pyramid body.

6. The display of claim 1, wherein the mirror layer comprises aluminum silicon.

7. The display of claim 1, wherein the array of nano-pyramid LEDs of a microLED provides redundancy such that the microLED remains functional if one or more nano-pyramid LEDs in the array of nano-pyramid LEDs fail.

8. The display of claim 1, wherein the plurality of microLEDs includes blue and green microLEDs.

9. A method for fabricating a display comprising a plurality of microLEDs, the method comprising:
    forming a release layer on a donor substrate;
    forming an array of nano-pyramid LEDs on the release layer, wherein each of the nano-pyramid LEDs comprises:
        a nano-pyramid structure including a nano-pyramid stem and a nano-pyramid body; and
        a mirror layer formed over the nano-pyramid body, wherein a tip of the nano-pyramid body is in contact with the mirror layer;
    irradiating the release layer to release the array of nano-pyramid LEDs from the donor substrate;
    transferring the array of nano-pyramid LEDs from the donor substrate to a backplane using a direct transfer process, wherein after the transferring step, each of the nano-pyramid stems contains a trace amount of a transition metal from the release layer; and
    securing the array of nano-pyramid LEDs to the backplane to form the display.

10. The method of claim 9, wherein the transition metal comprises titanium, niobium, or tantalum.

11. The method of claim 9, wherein each of the nano-pyramid LEDs comprises:
    an adhesion layer formed on the nano-pyramid body and beneath the mirror layer.

12. The method of claim 11, wherein the adhesion layer comprises nickel.

13. The method of claim 11, wherein the adhesion layer prevents diffusion of material from the mirror layer into the nano-pyramid body.

14. The method of claim 9, wherein the mirror layer comprises aluminum silicon.

15. The method of claim 9, wherein the array of nano-pyramid LEDs of a microLED provides redundancy such that the microLED remains functional if one or more nano-pyramid LEDs in the array of nano-pyramid LEDs fail.

16. The method of claim 9, wherein the plurality of microLEDs includes blue and green microLEDs.

* * * * *